United States Patent
Kurras et al.

(10) Patent No.: US 12,401,412 B2
(45) Date of Patent: Aug. 26, 2025

(54) ITERATIVE TRANSMIT REFINEMENT

(71) Applicant: Fraunhofer-Gesellschaft zur Förderung der angewandten Forschung e.V., Munich (DE)

(72) Inventors: Martin Kurras, Berlin (DE); Thomas Haustein, Berlin (DE); Lars Thiele, Berlin (DE); Jasmina McMenamy, Berlin (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 18/300,596

(22) Filed: Apr. 14, 2023

(65) Prior Publication Data
US 2023/0318690 A1    Oct. 5, 2023

Related U.S. Application Data

(63) Continuation of application No. PCT/EP2021/078488, filed on Oct. 14, 2021.

(30) Foreign Application Priority Data

Oct. 16, 2020    (EP) .................................... 20202354

(51) Int. Cl.
H04B 7/08    (2006.01)
H04L 5/00    (2006.01)
H04W 28/02   (2009.01)

(52) U.S. Cl.
CPC ........... H04B 7/086 (2013.01); H04L 5/0048 (2013.01); H04W 28/0215 (2013.01)

(58) Field of Classification Search
CPC .... H04B 7/0868; H04B 7/0842; H04B 7/086; H04B 7/0862; H04B 7/0848;
(Continued)

(56) References Cited

U.S. PATENT DOCUMENTS

2013/0272263 A1    10/2013  Pi et al.
2016/0099763 A1     4/2016  Chen
(Continued)

FOREIGN PATENT DOCUMENTS

CN    106559164 A    4/2017
CN    109792282 A    5/2019
(Continued)

OTHER PUBLICATIONS

Sassan Ahmadi, "5G NR: Architecture, Technology, Implementation, and Operation of 3GPP New Radio Standards", Academic Press, 2019.
(Continued)

Primary Examiner — Khanh C Tran
(74) Attorney, Agent, or Firm — Bridgeway IP Law Group, PLLC; Jihun Kim

(57) ABSTRACT

An apparatus for a wireless communication network is described that has an antenna unit. The antenna unit includes a plurality of antennas or one or more antenna arrays each having a plurality of antenna elements. The apparatus communicates with one or more network entities of the wireless communication network, like a base station or another UE. The apparatus transmits to or receives from the network entity a reference signal, like a Sounding Reference Signal, SRS, or a Synchronization Signal Block, SSB, using one or more beams beamformed by the apparatus using one or more input parameters. The apparatus transmits a feedback to the network entity, the feedback indicating the one or more input parameters the apparatus uses for beamforming the one or more beams, and/or the apparatus is configured or preconfigured, e.g., by the network entity, with the one or more input parameters.

19 Claims, 10 Drawing Sheets

(58) Field of Classification Search
CPC ..... H04B 7/0802; H04L 5/0048; H04L 5/005; H04L 5/0051; H04W 28/04; H04W 28/0215; H04W 28/0231; H04W 28/0236; H04W 28/0242; H04W 28/0247
See application file for complete search history.

(56) References Cited

U.S. PATENT DOCUMENTS

| | | | |
|---|---|---|---|
| 2017/0324455 A1* | 11/2017 | Soriaga | H04L 25/0202 |
| 2018/0041319 A1* | 2/2018 | Cheng | H04B 7/0695 |
| 2018/0091204 A1 | 3/2018 | Islam et al. | |
| 2018/0123648 A1* | 5/2018 | Nagaraja | H04B 17/15 |
| 2019/0253214 A1 | 8/2019 | Liu et al. | |
| 2019/0319688 A1* | 10/2019 | Sun | H04B 7/088 |
| 2019/0335430 A1 | 10/2019 | Ljung | |

FOREIGN PATENT DOCUMENTS

| | | |
|---|---|---|
| CN | 109891769 A | 6/2019 |
| WO | 2018/080660 A1 | 5/2018 |
| WO | 2019/066618 A1 | 4/2019 |
| WO | 2020/020453 A1 | 1/2020 |
| WO | 2020/140836 A1 | 7/2020 |

OTHER PUBLICATIONS

X. Lin et al., "5G new radio: Unveiling the essentials of the next generation wireless access technology", arXiv preprint arXiv:1806.06898, 2018.
3GPP, "5G; NR; Physical layer procedures for data", ETSI TS 38.214 version 16.2.0, Release 16, Section 6.2.1.2, Jul. 2020.
Huawei, HiSilicon, "Summary of remaining details of SRS design", Tdoc R1-1800090, RAN1#92, 2018.
3GPP, "5G; NR; Study on Integrated Access and Backhaul", Release 16, Section 7.3 , Dec. 2018.
3GPP, "New WID on Enhancements to Integrated Access and Backhaul", RP-193251, Dec. 2019.
3GPP, "5G; Study on New Radio (NR) access technology", TR 38.912, Version 14.0.0 Release 14, Section 8.3.1.6.3.1, Mar. 2017.
3GPP TS38.331 v16.2.0, "NR Radio Resource Control (RRC) protocol specification", 3GPP server release date Oct. 1, 2020.
3GPP TS38.214 v16.3.0, "NR; Physical layer procedures for data", 3GPP server release date Oct. 1, 2020.
3GPP TSG RAN WG1 #102-E ZTE, R1-2005461, "Further details on Multi-beam and Multi-TRP operation", 3GPP server release date Aug. 8, 2020.
Soo Nam Kim, "Office Action for KR Application No. 10-2023-7015819", Jun. 10, 2025, KIPO, Republic of Korea.
Wenting Jinag, "Office Action for CN Application No. 202180077815.8", May 30, 2025, CNIPA, China.

* cited by examiner

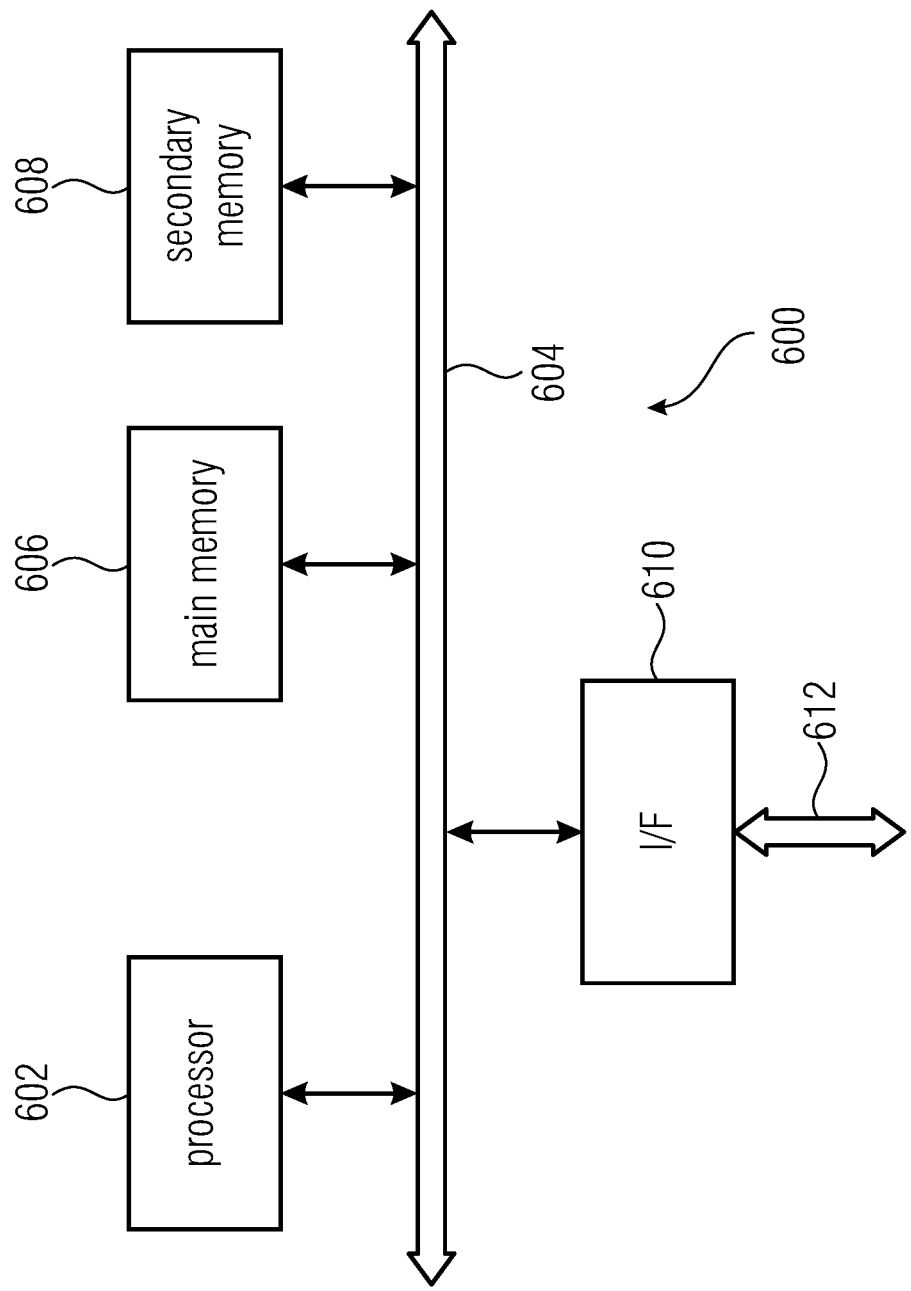

ITERATIVE TRANSMIT REFINEMENT

CROSS-REFERENCES TO RELATED APPLICATIONS

This application is a continuation of copending International Application No. PCT/EP2021/078488, filed Oct. 14, 2021, which is incorporated herein by reference in its entirety, and additionally claims priority from European Application No. EP 20 202 354.5, filed Oct. 16, 2020, which is incorporated herein by reference in its entirety.

The present application concerns the field of wireless communication systems or networks, more specifically, a communication between two network entities by means of multi-antenna transmissions.

BACKGROUND OF THE INVENTION

FIG. 1 is a schematic representation of an example of a terrestrial wireless network 100 including, as is shown in FIG. 1(a), the core network 102 and one or more radio access networks $RAN_1$, $RAN_2$, ... $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell.

The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. The external network may be the Internet, or a private network, such as an Intranet or any other type of campus networks, e.g. a private WiFi or 4G or 5G mobile communication system. Further, some or all of the respective base station $gNB_1$ to $gNB_5$ may be connected, e.g. via the S1 or X2 interface or the XN interface in NR, with each other via respective backhaul links $116_1$ to $116_5$, which are schematically represented in FIG. 1(b) by the arrows pointing to "gNBs". A sidelink channel allows direct communication between UEs, also referred to as device-to-device, D2D, communication. The sidelink interface in 3GPP is named PC5.

For data transmission a physical resource grid may be used. The physical resource grid may comprise a set of resource elements to which various physical channels and physical signals are mapped. For example, the physical channels may include the physical downlink, uplink and sidelink shared channels, PDSCH, PUSCH, PSSCH, carrying user specific data, also referred to as downlink, uplink and sidelink payload data, the physical broadcast channel, PBCH, carrying for example a master information block, MIB, and one or more of a system information block, SIB, one or more sidelink information blocks, SLIBs, if supported, the physical downlink, uplink and sidelink control channels, PDCCH, PUCCH, PSSCH, carrying for example the downlink control information, DCI, the uplink control information, UCI, and the sidelink control information, SCI, and physical sidelink feedback channels, PSFCH, carrying PC5 feedback responses. Note, the sidelink interface may a support 2-stage SCI. This refers to a first control region containing some parts of the SCI, and optionally, a second control region, which contains a second part of control information.

For the uplink, the physical channels may further include the physical random-access channel, PRACH or RACH, used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length. For example, in 5G a subframe has a duration of 1 ms, as in LTE. The subframe includes one or more slots, dependent on the subcarrier spacing. For example, at a subcarrier spacing of 15 kHz the subframe includes one slot, at a subcarrier spacing of 30 kHz the subframe includes two slots, at a subcarrier spacing of 60 kHz the subframe includes four slots, etc. Each slot may, in turn, include 12 or 14 OFDM symbols dependent on the cyclic prefix, CP, length.

The wireless communication system may be any single-tone or multicarrier system using frequency-division multiplexing, like the orthogonal frequency-division multiplexing, OFDM, system, the orthogonal frequency-division multiple access, OFDMA, system, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard, or the IEEE 802.11 standard.

The wireless network or communication system depicted in FIG. 1 may be a heterogeneous network having distinct overlaid networks, e.g., a network of macro cells with each macro cell including a macro base station, like base station $gNB_1$ to $gNB_5$, and a network of small cell base stations, not shown in FIG. 1, like femto or pico base stations. In addition to the above described terrestrial wireless network also non-terrestrial wireless communication networks, NTN, exist including space borne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard, or the IEEE 802.11 standard.

In mobile communication networks, for example in a network like that described above with reference to FIG. 1, like a LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, roadside entities, like traffic lights, traffic signs, or pedestrians. RSUs may have functionalities of BS or of UEs, depending on the specific network configuration. Other UEs may not be vehicular related UEs and may comprise any of the above-mentioned devices. Such devices may also communicate directly with each other, D2D communication, using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station, e.g., GSM, UMTS, LTE base stations, that may not support certain service, like NR V2X services.

When considering two UEs directly communicating with each other over the sidelink, e.g., using the PC5/PC3 interface, one of the UEs may also be connected with a BS, and may relay information from the BS to the other UE via the sidelink interface and vice-versa. The relaying may be performed in the same frequency band, in-band-relay, or another frequency band, out-of-band relay, may be used. In the first case, communication on the Uu and on the sidelink may be decoupled using different time slots as in time division duplex, TDD, systems.

FIG. 2(a) is a schematic representation of an in-coverage scenario in which two UEs directly communicating with each other are both connected to a base station. The base station gNB has a coverage area that is schematically represented by the circle 150 which, basically, corresponds to the cell schematically represented in FIG. 1. The UEs directly communicating with each other include a first vehicle 152 and a second vehicle 154 both in the coverage area 150 of the base station gNB. Both vehicles 152, 154 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a Mode 1 configuration in NR V2X or as a Mode 3 configuration in LTE V2X.

FIG. 2(b) is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 156, 158 and 160 are shown directly communicating with each other over a sidelink, e.g., using the PC5 interface. The scheduling and/or interference management of the V2V traffic is based on algorithms implemented between the vehicles. This configuration is also referred to as a Mode 2 configuration in NR V2X or as a Mode 4 configuration in LTE V2X. As mentioned above, the scenario in FIG. 2(b) which is the out-of-coverage scenario does not necessarily mean that the respective Mode 2 UEs in NR or mode 4 UEs in LTE are outside of the coverage 150 of a base station, rather, it means that the respective Mode 2 UEs in NR or mode 4 UEs in LTE are not served by a base station, are not connected to the base station of the coverage area, or are connected to the base station but receive no SL resource allocation configuration or assistance from the base station. Thus, there may be situations in which, within the coverage area 150 shown in FIG. 2(a), in addition to the NR Mode 1 or LTE Mode 3 UEs 152, 154 also NR Mode 2 or LTE mode 4 UEs 156, 158, 160 are present. In addition, FIG. 2(b), schematically illustrates an out of coverage UE using a relay to communicate with the network. For example, the UE 160 may communicate over the sidelink with UE1 which, in turn, may be connected to the gNB via the Uu interface. Thus, UE1 may relay information between the gNB and the UE 160

Although FIG. 2(a) and FIG. 2(b) illustrate vehicular UEs, it is noted that the described in-coverage and out-of-coverage scenarios also apply for non-vehicular UEs. In other words, any UE, like a hand-held device, communicating directly with another UE using SL channels may be in-coverage and out-of-coverage.

It is noted that the information in the above section is only for enhancing the understanding of the background of the invention and, therefore, it may contain information that does not form conventional technology that is already known to a person of ordinary skill in the art.

Starting from the above, there may be a need for improvements or enhancements for a multi-antenna transmission among a plurality of network entities of a wireless communication network.

SUMMARY

An embodiment may have an apparatus for a wireless communication network, comprising: an antenna unit, the antenna unit comprising a plurality of antennas or one or more antenna arrays each comprising a plurality of antenna elements; wherein the apparatus is to communicate with one or more network entities of the wireless communication network, like a base station or another UE, wherein the apparatus is to transmit to or receive from the network entity a reference signal, like a Sounding Reference Signal, SRS, or a Synchronization Signal Block, SSB, using one or more beams beamformed by the apparatus using one or more input parameters, and wherein the apparatus is to transmit a feedback to the network entity, the feedback indicating the one or more input parameters the apparatus uses for beamforming the one or more beams, and/or wherein the apparatus is configured or preconfigured, e.g., by the network entity, with the one or more input parameters.

Another embodiment may have an apparatus for a wireless communication network, comprising: an antenna unit, the antenna unit comprising a plurality of antennas or one or more antenna arrays each comprising a plurality of antenna elements; wherein the apparatus is to communicate with one or more network entities of the wireless communication network, like a base station or another UE, wherein the apparatus is to transmit to or receive from the network entity a reference signal, like a Sounding Reference Signal, SRS, or a Synchronization Signal Block, SSB, using one or more beams beamformed by the apparatus in accordance with one or more performance parameters, and wherein the apparatus is to transmit a feedback to the network entity, the feedback indicating the one or more performance parameters in accordance with which the apparatus beamforms the one or more beams, and/or wherein the apparatus is configured or preconfigured, e.g., by the network entity, with the one or more performance parameters.

Another embodiment may have a network entity of a wireless communication network, wherein the network entity is to communicate with one or more apparatus according to the invention.

Another embodiment may have a wireless communication network, comprising a plurality of network entities communication with each other, wherein one or more of the plurality of network entities comprise an apparatus or a network entity according to the invention.

Another embodiment may have a method for operating an apparatus for a wireless communication network, the apparatus comprising an antenna unit comprising a plurality of antennas or one or more antenna arrays each comprising a plurality of antenna elements, and the communicating with one or more network entities of the wireless communication network, like a base station or another UE, the method comprising: transmitting to or receiving from the network entity a reference signal, like a Sounding Reference Signal, SRS, or a Synchronization Signal Block, SSB, using one or more beams beamformed by the apparatus using one or more input parameters, and transmitting a feedback to the network entity, the feedback indicating the one or more input parameters the apparatus uses for beamforming the one or more beams, and/or configuring or preconfiguring the apparatus, e.g., by the network entity, with the one or more input parameters.

Another embodiment may have a method for operating an apparatus for a wireless communication network, the apparatus comprising an antenna unit comprising a plurality of antennas or one or more antenna arrays each comprising a plurality of antenna elements, and the communicating with one or more network entities of the wireless communication network, like a base station or another UE, the method comprising: transmitting to or receiving from the network entity a reference signal, like a Sounding Reference Signal, SRS, or a Synchronization Signal Block, SSB, using one or more beams beamformed by the apparatus in accordance with one or more performance parameters, and transmitting a feedback to the network entity, the feedback indicating the one or more performance parameters in accordance with which the apparatus beamforms the one or more beams, and/or configuring or preconfiguring the apparatus, e.g., by the network entity, with the one or more performance parameters.

Another embodiment may have a non-transitory digital storage medium having a computer program stored thereon to perform the method for operating an apparatus for a wireless communication network, the apparatus comprising an antenna unit comprising a plurality of antennas or one or more antenna arrays each comprising a plurality of antenna elements, and the communicating with one or more network entities of the wireless communication network, like a base station or another UE, the method comprising: transmitting to or receiving from the network entity a reference signal, like a Sounding Reference Signal, SRS, or a Synchronization Signal Block, SSB, using one or more beams beamformed by the apparatus using one or more input parameters, and transmitting a feedback to the network entity, the feedback indicating the one or more input parameters the apparatus uses for beamforming the one or more beams, and/or configuring or preconfiguring the apparatus, e.g., by the network entity, with the one or more input parameters, when said computer program is run by a computer.

Another embodiment may have a non-transitory digital storage medium having a computer program stored thereon to perform the method for operating an apparatus for a wireless communication network, the apparatus comprising an antenna unit comprising a plurality of antennas or one or more antenna arrays each comprising a plurality of antenna elements, and the communicating with one or more network entities of the wireless communication network, like a base station or another UE, the method comprising: transmitting to or receiving from the network entity a reference signal, like a Sounding Reference Signal, SRS, or a Synchronization Signal Block, SSB, using one or more beams beamformed by the apparatus in accordance with one or more performance parameters, and transmitting a feedback to the network entity, the feedback indicating the one or more performance parameters in accordance with which the apparatus beamforms the one or more beams, and/or configuring or preconfiguring the apparatus, e.g., by the network entity, with the one or more performance parameters, when said computer program is run by a computer.

BRIEF DESCRIPTION OF THE DRAWINGS

Embodiments of the present invention will be detailed subsequently referring to the appended drawings, in which:
FIGS. 1(a)-1(b) are schematic representations of an example of a terrestrial wireless network, wherein
FIG. 1(a) illustrates a core network and one or more radio access networks,
and FIG. 1(b) is a schematic representation of an example of a radio access network RAN;
FIGS. 2(a)-2(b) schematic represent in-coverage and out-of-coverage scenarios, wherein
FIG. 2(a) is a schematic representation of an in-coverage scenario in which two UEs directly communicating with each other are both connected to a base station,
and FIG. 2(b) is a schematic representation of an out-of-coverage scenario in which the UEs directly communicating with each other.

FIG. 10 illustrates an example of a computer system on which units or modules as well as the steps of the methods described in accordance with the inventive approach may execute.

DETAILED DESCRIPTION OF THE INVENTION

Embodiments of the present invention are now described in more detail with reference to the accompanying drawings, in which the same or similar elements have the same reference signs assigned.

Figure 1A:
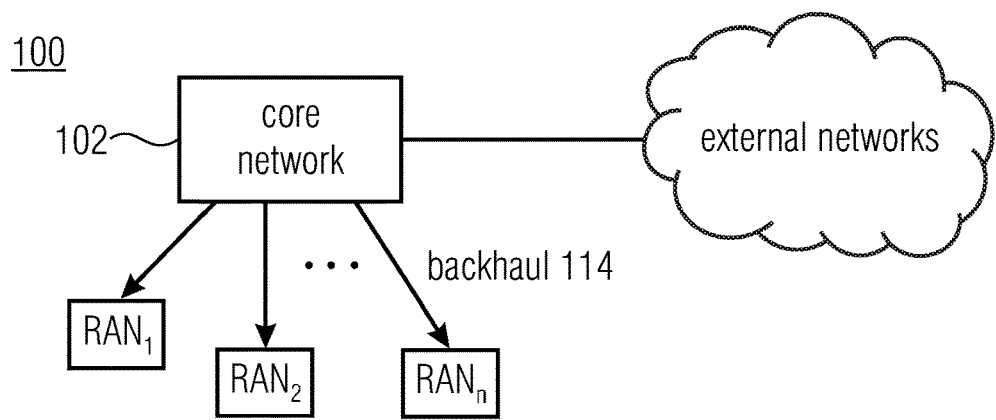
Figure 1B:
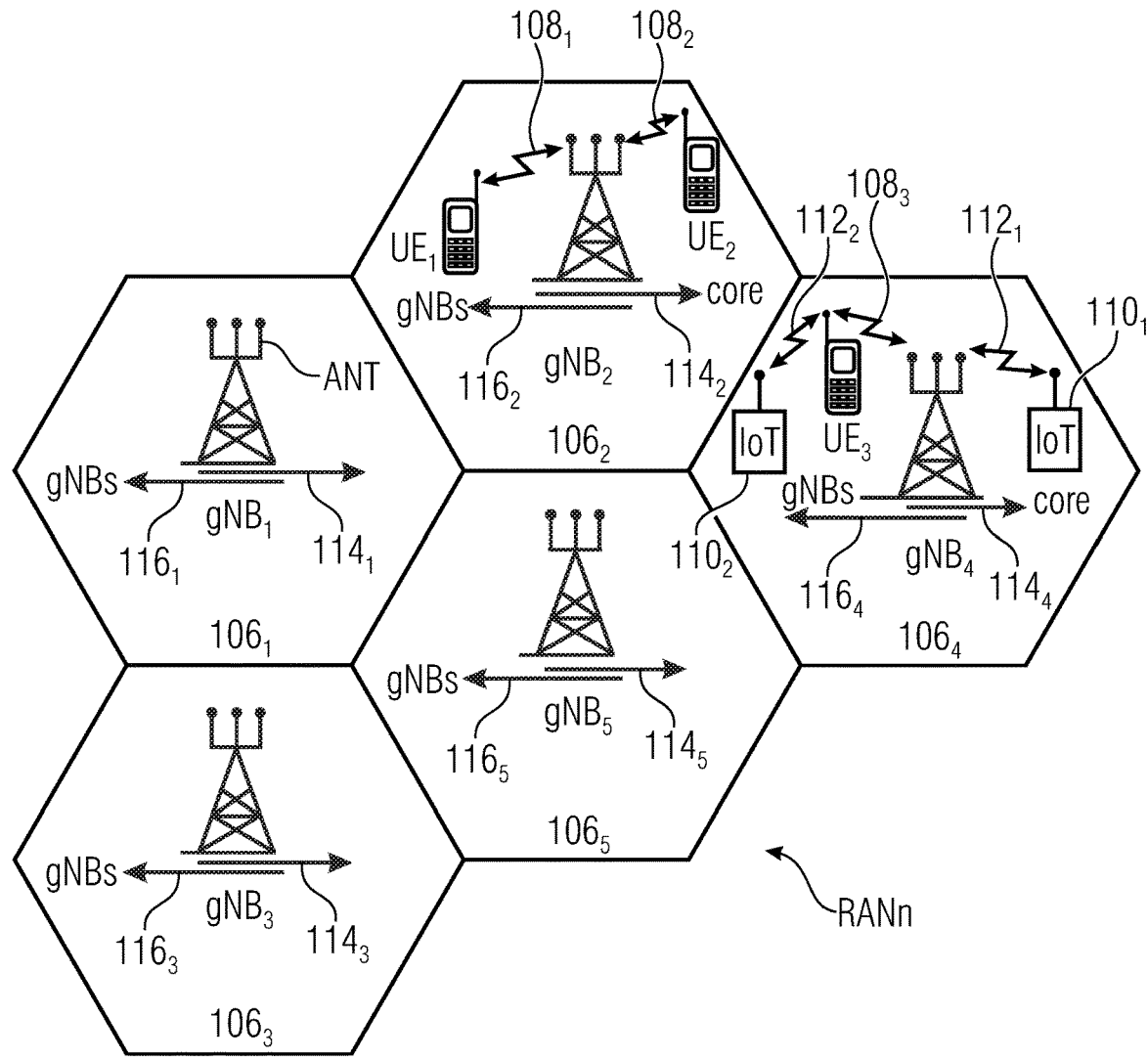
Figure 2A:
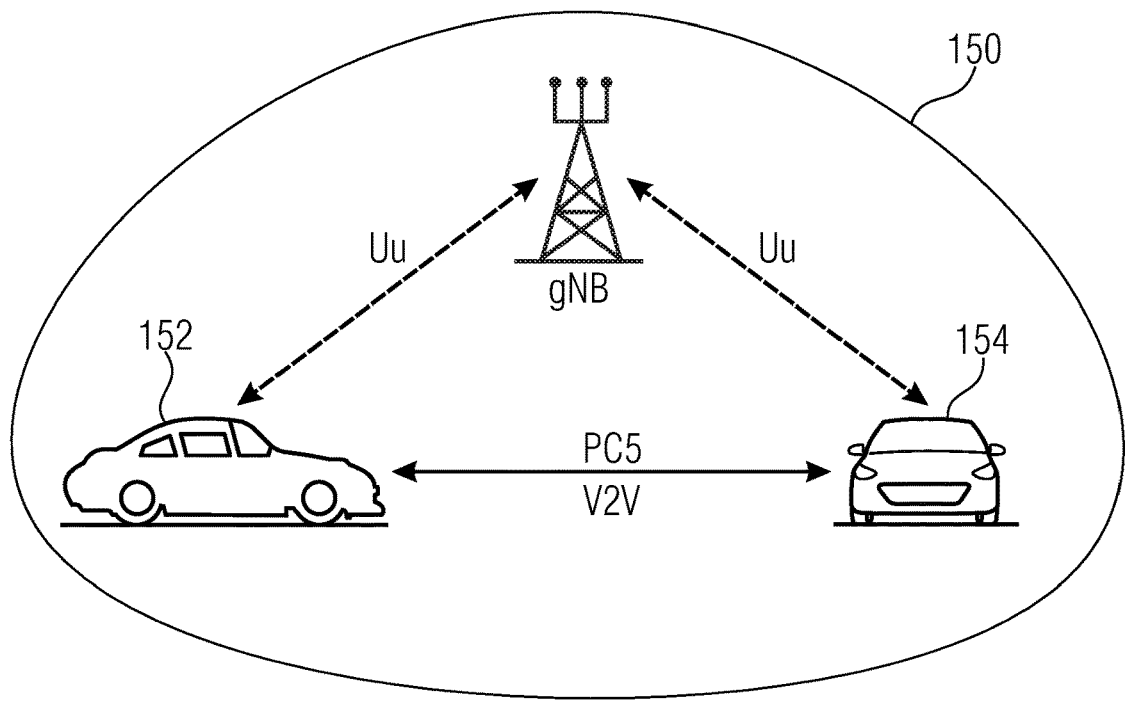
Figure 2B:
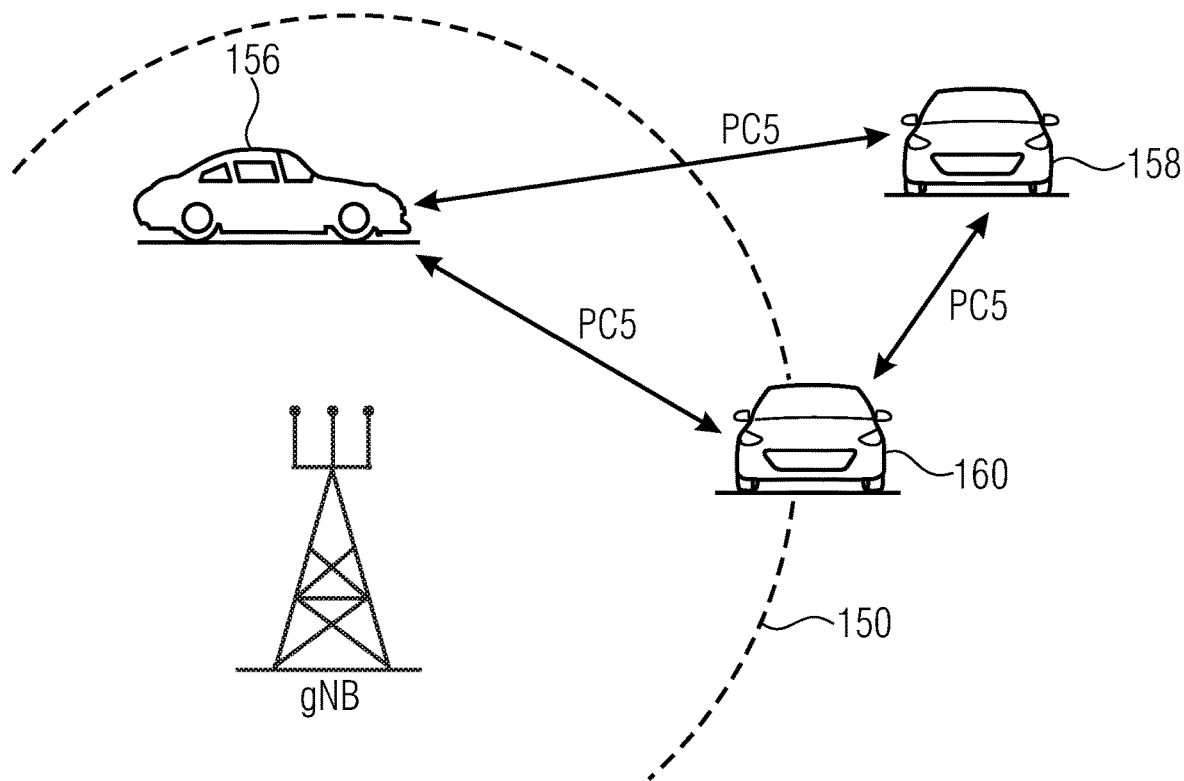

In a wireless communication system or network, like the one described above with reference to FIG. 1 or with reference to FIG. 2, respective network entities may communicate with each other by means of a multi-antenna transmission. The network entities involved in such a communication may include user devices, UEs, base stations, like a gNB or an integrated access and backhaul, IAB, node or any network terminating node, NTN. For example, the communication may be between a UE and a radio access network, RAN, entity, like the above-mentioned base station, over the Uu interface, or the communication may be between user devices over the sidelink using, for example, the PC5 interface. The communication system or network may operate in certain frequency ranges, like frequency range 1, FR1, also referred to as the sub-6 GHz range, or in the frequency range 2, FR2, also referred to as the millimeter wave range. When communicating in FR2, beamforming is applied for a communication among the network entities. To handle a communication in FR2, beam management is employed which is a set of procedures on the UE side and on the gNB side, so as to determine the best set of beams for the communication. The convergence on using the appropriate set of beams on the transmitting, Tx, side and on the receiving, Rx, side may be an iterative process that adds delay to the link establishment. This may be particularly true for cases where no beam correspondence between a Tx beam and an Rx beam exists.

Beam correspondence is for example the ability of the UE to select a suitable beam for the uplink transmission based on the downlink measurement with or without relying on uplink beam sweeping. For example, the beam correspondence requirement may be satisfied when assuming the presence of both SSB and CSI-RS signals and a type D Quasi-colocation, QCL, being maintained between the SSB and the CSI-RS. Two antenna ports are said to be quasi co-located, if certain channel properties over which a symbol on one antenna port is transmitted may be inferred from the channel properties over which a symbol on the other antenna port is transmitted [1].

Further, regarding beam management, for example, in case a selected Rx beam on the downlink is not suitable for an uplink transmission by the UE, a separate beam management procedure needs to be performed on the uplink. Also, there may be situations in which no or very little traffic occurs in a certain direction. For example, when considering the user device to be a sensor or a device of reduced capability that does not receive any or only very little UE-specific downlink traffic from the serving entity, like the base station, it is not possible to perform a beam management procedure using certain reference signals, like channel state information reference signals, CSI-RS.

For a communication from a user device to a gNB, a sounding reference signal, SRS, may be employed which enables the gNB to estimate the uplink channel from the UE to the gNB. Analogous to the downlink CSI-RS, the SRS may serve as a quasi-co-located, QCL, reference for other physical channels such that they may be configured and transmitted quasi-co-located with the SRS, as is described, for example, in Reference [1]. In accordance with the 5G or NR standard, the so-called NR-SRS may be configured specifically for a certain UE, as is described, for example, in Reference [2] stating:

"Contrary to LTE, NR SRS is UE specifically configured. This enables a high degree of flexibility in the system. In the time domain, an SRS resource spans 1, 2 or 4 consecutive symbols mapped within the last 6 symbols of a slot. Multiple SRS symbols allow coverage extension and increased sounding capacity. If multiple resources are configured for a UE, intra-slot antenna switching is also supported (when UE has fewer transmit chains than receive chains). Both these features are important, e.g., in the reciprocity use case. The SRS sequence design and frequency hopping mechanism are similar to LTE SRS."

In accordance with the 5G standard, an uplink, UL, transmission may be a non-codebook-based transmission or a codebook-based transmission, as it is for example described in FIG. 11.13 of Reference [3]. In either case, the gNB informs the UE which SRS is to be used via the SRS resource indicator, SRI. The SRI determines the antenna ports and uplink transmission beams to be used for the physical uplink shared channel, PUSCH, transmission. The number of bits of the SRS depends on the number of SRS groups configured and whether a codebook based precoding or a non-codebook-based precoding is used, as is described in Reference [1].

Dependent on the SRS configuration, the UE may perform antenna switching, for example, dependent on an RRC parameter setting in the SRS resource set described in Reference [4]. Dependent on the capabilities of the UE, a supported SRS-Tx port switch may be one transmit port/two receive ports, 1T2R or 1T4R or 2T4R or T=R. In Reference [5], the association between SRS and UE antenna ports are described for different Tx/Rx configurations as follows:

"< Association between SRS ports and UE antenna ports for 1T2R >

| SRS Ports | UE Antenna Ports |
|---|---|
| SRS port 0 of the first SRS resource | UE antenna port 0 |
| SRS port 0 of the second SRS resource | UE antenna port 1 |

< Association between SRS ports and UE antenna ports for 2T4R >

| SRS Ports | UE Antenna Ports |
|---|---|
| SRS port 0 of the first SRS resource | UE antenna port 0 |
| SRS port 1 of the first SRS resource | UE antenna port 1 |
| SRS port 0 of the second SRS resource | UE antenna port 2 |
| SRS port 1 of the second SRS resource | UE antenna port 3 |

< Association between SRS ports and UE antenna ports for 1T4R >

| SRS Ports | UE Antenna Ports |
|---|---|
| SRS port 0 of the first SRS resource | UE antenna port 0 |
| SRS port 0 of the second SRS resource | UE antenna port 1 |
| SRS port 0 of the third SRS resource | UE antenna port 2 |
| SRS port 0 of the fourth SRS resource | UE antenna port 3 |

"

Reference [6] refers to the NR SRS design as follows:
NR SRS design should not assume a particular antenna configuration at UE and should support dynamic port/antenna/resource selection by gNB and UE. In the case of UE selection, it can be disabled/enabled by gNB (if the UE selection is not transparent).

NR UL supports transmissions of SRS precoded with same and different UE Tx beams within a time duration. NR supports the following Tx beamformer determination for SRS.

UE applies gNB-transparent Tx beamformer to SRS, e.g.,
UE determines Tx beam for each SRS port/resource
Based on gNB indication, e.g. via SRI
NR supports SRS transmission including number of SRS ports are 1, 2, and 4 at least, Comb levels of 2 and 4, and configurable frequency hopping.

Configurable SRS bandwidth is supported. SRS can be configurable with regard to density in frequency domain (e.g., comb levels) and/or in time domain (including multi-symbol SRS transmissions). Partial band size and full band size can be configured. Partial-band is smaller than the largest transmission bandwidth supported by the UE. Within a partial band, the PRBs for SRS transmission can at least be consecutive in the frequency domain. Frequency hopping is supported within a partial-band for a UE where at least hopping with a granularity of subband is supported. For the full band size, the size is equal to the largest transmission bandwidth supported by the UE. The numerology(ies) for the SRS transmissions can be also configurable for a UE.

An NR-SRS resource comprises of a set of resource elements (RE) within a time duration/frequency span and N antenna ports (N≥1). A UE can be configured with K≥1 NR-SRS resources. The maximum value of K is considered to be a UE capability to avoid mandatory support for large values of K. Out of K≥1 configured NR-SRS resources, for aperiodic transmission, the UE can be configured to transmit a subset of or all K NR-SRS resources with no precoding, the same, or different precoding. For periodic and semi-persistent transmission, out of K≥1 configured NR-SRS resources, the UE can be configured to transmit K NR-SRS resources with no precoding, the same, or different precoding.

SRS transmissions with sequences achieving low-PAPR and possible multiplexing of SRS with different SRS bandwidths in the same symbol are considered.

Aperiodic SRS transmission triggered by the network is supported. Periodic and semi-persistent NR-SRS transmissions are also supported."

Reference [7] describes that the SRI is part of the downlink control information, DCI, and states with reference to the DCI format 0_1 the following:

"
. . .

| Field (Item) | Bits | Reference |
|---|---|---|
| SRS resource indicator | Variable | Determined by RRC Parameter SRS-SetUse |
| . . . | | |
| < SRS resource indicator > SRS-ResourceSet.usage | Bit Length of SRS Resource Indicator | |
| CodeBook | $\left\lceil \log_2\left(\sum_{k=1}^{L_{max}} \binom{N_{SRS}}{k}\right) \right\rceil$ | N_SRS is the number of configured SRS resources in the SRS resource set associated with "usage". |
| NonCodeBook | $\lceil \log_2(N_{SRS}) \rceil$ | |

"

Reference [8] describes in chapter 6.2.1 the UE sounding procedure for certain SRS resource configurations as follows:

"For a UE configured with one or more SRS resource configuration(s), and when the higher layer parameter resourceType in SRS-Resource is set to 'periodic':
  if the UE is configured with the higher layer parameter spatialRelationInfo containing the ID of a reference 'ssb-Index', the UE shall transmit the target SRS resource with the same spatial domain transmission filter used for the reception of the reference SS/PBCH block,
  if the higher layer parameter spatialRelationInfo contains the ID of a reference 'csi-RS-Index', the UE shall transmit the target SRS resource with the same spatial domain transmission filter used for the reception of the reference periodic CSI-RS or of the reference semi-persistent CSI-RS, if the higher layer parameter spatialRelationInfo containing the ID of a reference 'srs', the UE shall transmit the target SRS resource with the same spatial domain transmission filter used for the transmission of the reference periodic SRS. When the SRS is configured by the higher layer parameter [SRS-for-positioning] and if the higher layer parameter spatialRelationInfo contains the ID of a reference 'DL-PRS-ResourceId', the UE shall transmit the target SRS resource with the same spatial domain transmission filter used for the reception of the reference DL PRS.

For a UE configured with one or more SRS resource configuration(s), and when the higher layer parameter resourceType in SRS-Resource is set to 'semi-persistent':
   If the UE is configured with the higher layer parameter spatialRelationInfo containing the ID of a reference 'ssb-Index', the UE shall transmit the target SRS resource with the same spatial domain transmission filter used for the reception of the reference SS/PBCH block,
   if the higher layer parameter spatialRelationInfo contains the ID of a reference 'csi-RS-Index', the UE shall transmit the target SRS resource with the same spatial domain transmission filter used for the reception of the reference periodic CSI-RS or of the reference semi-persistent CSI-RS, or of the latest reference aperiodic CSI-RS.
   If the higher layer parameter spatialRelationInfo contains the ID of a reference 'srs', the UE shall transmit the target SRS resource with the same spatial domain transmission filter used for the transmission of the reference periodic SRS or of the reference semi-persistent SRS or of the reference aperiodic SRS.
   When the SRS is configured by the higher layer parameter [SRS-for-positioning] and if the higher layer parameter spatialRelationInfo contains the ID of a reference 'DL-PRS-ResourceId', the UE shall transmit the target SRS resource with the same spatial domain transmission filter used for the reception of the reference DL PRS.

For a UE configured with one or more SRS resource configuration(s), and when the higher layer parameter resourceType in SRS-Resource is set to 'aperiodic':
   if the UE is configured with the higher layer parameter spatialRelationInfo containing the ID of a reference 'ssb-Index', the UE shall transmit the target SRS resource with the same spatial domain transmission filter used for the reception of the reference SS/PBCH block,
   if the higher layer parameter spatialRelationInfo contains the ID of a reference 'csi-RS-Index', the UE shall transmit the target SRS resource with the same spatial domain transmission filter used for the reception of the reference periodic CSI-RS or of the reference semi-persistent CSI-RS, or of the latest reference aperiodic CSI-RS.
   If the higher layer parameter spatialRelationInfo contains the ID of a reference 'srs', the UE shall transmit the target SRS resource with the same spatial domain transmission filter used for the transmission of the reference periodic SRS or of the reference semi-persistent SRS or of the reference aperiodic SRS.
   When the SRS is configured by the higher layer parameter [SRS-for-positioning] and if the higher layer parameter spatialRelationInfo contains the ID of a reference 'DL-PRS-ResourceId', the UE shall transmit the target SRS resource with the same spatial domain transmission filter used for the reception of the reference DL PRS."

Thus, as described above, for allowing a base station to estimate an uplink channel from a user device to the base station, the user device transmits the SRS over respective SRS ports using certain beamformers or spatial filters, and for a reliable transmission, for example, in FR2, an appropriate set of beams for a communication between the UE and the gNB needs to be determined. For example the gNB may be a IAB node supporting frequency ranges up to 100 GHz. An IAB node provides for an access to the wireless communication network and also for a wireless backhaul communication with other nodes. The IAB concept allows for a flexible an dense deployment of NR cells without densifying the transport network proportionally, and it may support a single-hop operation as well as a multi-hop operation. A number of aspects regarding the IAB node are currently studied, like the protocol stack and the network architecture design, the route selection and optimization, the resource allocation and route management coordination over multiple hops, the dynamic resource allocation between the backhaul links and the access links, the cross-link interference, CLI, measurements and managements and the like. Considering that IAB supports multi-hop communication, IAB nodes, besides providing access to their UEs via g-NB Distributed Unit (g-NB DU) functionality, also incorporate a subset of UE functionality, referred to as Mobile Termination (MT). Hence, an IAB node, that is its MT, also transmits SRS over respective SRS ports using certain beamformers towards the upstream IAB node, analogous to a UE. Hence, for the present invention, besides the SRS transmission, the resource coordination and cross-link-interference management between respective nodes is of interest, as resource coordination is required due to multiplexing the access links and the backhaul links in time, frequency or space under a per-link half-duplex constraint across one or more backhaul link, BH, hops for both TDD and FDD operations and for both downlink, DL, and uplink, UL, directions. Related to the resource coordination is the cross-link-interference measurement and management, and, currently, the frame structure, timing alignment and initial access or radio resource management, RRM, procedures for IAB nodes focus on TDM operation where either the access link or the backhaul link is active in a given time/frequency resource.

The table below depicts how different time-slots may be configured to meet the half-duplex constraint in IAB networks (see Reference [9]).

| DU Configuration | MT configuration | | |
| --- | --- | --- | --- |
| | DL | UL | F |
| DL-H | DU: Tx<br>MT: NULL | DU: Tx<br>MT: NULL | DU: Tx<br>MT: NULL |
| DL-S | When DU resource: IA<br>DU: Tx<br>MT: NULL<br>When DU resource: INA<br>DU: NULL<br>MT: Rx | When DU resource: IA<br>DU: Tx<br>MT: NULL<br>When DU resource: INA<br>DU: NULL<br>MT: Tx | When DU resource: IA<br>DU: Tx<br>MT: NULL<br>When DU resource: INA<br>DU: NULL<br>MT: Tx/Rx |
| UL-H | DU: Rx<br>MT: NULL | DU: Rx<br>MT: NULL | DU: Rx<br>MT: NULL |
| UL-S | When DU resource: IA<br>DU: Rx<br>MT: NULL<br>When DU resource: INA<br>DU: NULL<br>MT: Rx | When DU resource: IA<br>DU: Rx<br>MT: NULL<br>When DU resource: INA<br>DU: NULL<br>MT: Tx | When DU resource: IA<br>DU: Rx<br>MT: NULL<br>When DU resource: INA<br>DU: NULL<br>MT: Tx/Rx |

-continued

| DU | MT configuration | | |
|---|---|---|---|
| Configuration | DL | UL | F |
| F-H | DU: Tx/Rx<br>MT: NULL | DU: Tx/Rx<br>MT: NULL | DU: Tx/Rx<br>MT: NULL |

The meaning of the abbreviations below are as follows:
"MT: Tx" means that the mobile terminal of the IAB node, MT, should transmit if scheduled;
"DU: Tx" means that the distributed unit of the IAB node, DU, may transmit;
"MT: Rx" means that the MT should be able to receive, if there is anything to receive;
"DU: Rx" means that the DU may schedule uplink transmissions from child nodes or UEs;
"MT: Tx/Rx" means that the MT should transmit if scheduled and should be able to receive, but not simultaneously;
"DU: Tx/Rx" means that the DU may transmit and may schedule uplink transmission from child nodes and UEs, but not simultaneously;
"IA" means that the DU resource is explicitly or implicitly indicated as available;
"INA" means that the DU resource is explicitly or implicitly indicated as not available;
"MT: NULL" means that the MT does not transmit and does not have to be able to receive;
"DU: NULL" means that the DU does not transmit and does not schedule uplink transmission from child nodes and UEs.

Each of the time-resource types of the DU child link may belong to one of two categories:
 Hard—time resource is available for the DU child link
 Soft—the availability is explicitly and/or implicitly controlled by the parent node The time-domain resources at MT, i.e., the part of the IAB node that connects to a parent node, and the time-domain resources at DU, i.e., the part of the IAB node that connects to a child IAB or to a UE, may be for the downlink, may be for the uplink or may be used flexibly. In addition, from an IAB DU point of view, a child link may have a status "no available time resources", i.e., resources are not to be used for a communication on the DU child links. In Reference [10] enhancements to the resource multiplexing between child and parent links of a IAB node are discussed, including a support of simultaneous operations of child and parent links of an IAB node, namely simultaneous transmissions and/or receptions, like MT Tx/DU Tx, MT Tx/DU Rx, MT Rx/DU Tx, MT Rx/Du Rx. Moreover, duplexing enhancements are described including a specification of CLI and interference measurements of backhaul, BH, links to support simultaneous operation of the child and parent links of an IAB node, like the above simultaneous transmission and/or reception.

As described above, a UE may transmit the SRS so as to allow the gNB to estimate an uplink channel from the UE. For transmitting the SRS, the UE may use a precoder or a beamformer or a spatial filter so as to create one or more transmit beams which carry the SRS. So far, reference has been made to a communication between a user device and a RAN entity, like a gNB, however, the above is not limited to a communication over, for example, the Uu interface, but equally applies to a sidelink communication among user devices, for example, over the PC5 interface. Thus, also, in device-to-device communications, like V2X, a receiving UE communicating with a transmitting UE over a sidelink may transmit respective reference signals so as to allow the transmitting UE to estimate the sidelink channel for a transmission from the receiving UE to the transmitting UE over the sidelink. Also, in such scenarios, the receiving UE may use a precoder or a beamformer or a spatial filter so as to create one or more transmit beams carrying the reference signal.

Further, an important aspect in beam management in NR on the UL and on the DL is the beam indication. On the DL, beam indication is supported through the QCL relation, specifically QCL-Type-D. The UE may use the signaled QCL-Type-D relation to adjust its Rx beam. QCL relations are conveyed to the UE using the Transmission Configuration Indication (TCI) framework. TCI is used to indicate to the UE the QCL relations between PDCCH and/or PDSCH and other reference signals. In Rel. 15/16, QCL/TCI is used on the DL only. QCL enables the UE to infer other channel properties from particular reference signals. In other words, QCL enables grouping of reference signals with respect to their properties regarding Doppler shift, Doppler spread, average delay, delay spread and spatial Rx filter.

In NR, there are four such groups—QCL Types A, B, C and D (TS 38.214 v16.5.0, Release 16):
 'typeA': {Doppler shift, Doppler spread, average delay, delay spread}
 'typeB': {Doppler shift, Doppler spread}
 'typeC': {Doppler shift, average delay}
 'typeD': {Spatial Rx parameter}

TCI is used to indicate to the UE that PDCCH and/or PDSCH use the same transmit beam as a reference signal, such as CSI-RS or SS block. TCI is organized through TCI states, and each TCI state provides the linkage between the reference signals that need to be demodulated and other indicated reference signals. TCI states also indicate the application for which this TCI state is to be used. Each UE may be configured with up to 64 TCI states. TCI states are configured and indicated to the UE using a combination of RRC, MAC CE and DCI. For example, beam indication for PDCCH is done by assigning a subset of the M configured candidate states via RRC signaling to each configured CORESET. Using MAC signaling, the network may dynamically indicate a specific TCI state, within the per-CORESET-configured subset, to be valid. When monitoring a PDCCH within a certain CORESET, the device may assume that the PDCCH transmission uses the same spatial filter as the reference signal associated with the MAC-indicated TCI.

The Information Element TCI-State is depicted below (TS 38.331 v16.3.1, Release 16).

```
- - ASN1START
- - TAG-TCI -STATE-START
TCI-State : :=                SEQUENCE {
    tci-StateId                  TCI-StateId,
    qcl-Type1                    QCL-Info,
    qcl-Type2                    QCL-Info
```

```
                        -continued
OPTIONAL,    - - Need R
    . . .
}
QCL-Info : :=                   SEQUENCE {
    cell                            ServCellIndex
OPTIONAL,    - - Need R
    bwp-Id                          BWP-Id
OPTIONAL, - - Cond CSI-RS-Indicated
    referenceSignal                 CHOICE {
        csi-rs                          NZP-CSI-RS-ResourceId,
        ssb                             SSB-Index
    },
    qcl-Type                        ENUMERATED {typeA, typeB, typeC, typeD},
    . . .
}
- - TAG-TCI-STATE-STOP
- - ASN1STOP
```

Beam indication on the UL is in Release 15/16 supported using spatial relations. If the UE supports spatial relations and beam correspondence holds, a spatial relation may be configured to hold between a received DL reference signal and a transmitted UL signal. Alternatively, a spatial relation may be defined or configured between two UL transmissions at the UE, such as an SRS and a PUCCH. In that case, the UE shall transmit the PUCCH with the same antenna pattern, for example, beam, as previously transmitted the associated SRS. Hence, the network receiver may infer the quality it would receive a PUCCH with by measuring the SRS. In addition, the gNB may in this case use the same receive spatial filter/beam to receive PUCCH and SRS. Below is the PUCCH-SpatialRelationINfo (TS 38.331 V16.3.1, Release 16)

PUCCH-SpatialRelationInfo Information Element

```
- - ASN1START
- - TAG-PUCCH-SPATIALRELATIONINFO-START
PUCCH-SpatialRelationInfo : :=     SEQUENCE {
    pucch-SpatialRelationInfoId        PUCCH-SpatialRelationInfoId,
    servingCellId                      ServCellIndex
OPTIONAL,        - - Need S
    referenceSignal                    CHOICE {
        ssb-Index                          SSB-Index,
        csi-RS-Index                       NZP-CSI-RS-ResourceId,
        srs                                PUCCH-SRS
    },
    pucch-PathlossReferenceRS-Id       PUCCH-PathlossReferenceRS-Id,
    p0-PUCCH-Id                        P0-PUCCH-Id,
    closedLoopIndex                    ENUMERATED { i0, i1 }
}
PUCCH-SpatialRelationInfoExt-r16 : :=   SEQUENCE {
    pucch-SpatialRelationInfoId-v1610       PUCCH-SpatialRelationInfoId-v1610
OPTIONAL,        - - Cond SetupOnly          PUCCH-PathlossReferenceRS-Id-v1610
    pucch-PathlossReferenceRS-Id-v1610
OPTIONAL,        - -Need R
    . . .
}
PUCCH-SRS : :=                     SEQUENCE {
    resource                           SRS-ResourceId,
    uplinkBWP                          BWP-Id
}
- - TAG-PUCCH-SPATIALRELATIONINFO-STOP
- - ASN1STOP
. . .
```

In scenarios as summarized above, while the use of precoders or beamformers or spatial filters for creating respective beams carrying the reference signal is advantageous, still the beam management, for example in FR2, may require the above-mentioned iterative process that adds to the delay in the link establishment. The UE may transmit the reference signal on one or more transmit beams created at its end, but still, for the beam management, the communication partner receiving the reference signal, like the gNB in case of an SRS or a UE in case of a sidelink communication, needs to evaluate the received reference signals so as to allow for adapting the precoders or beamformers or spatial filters used at the base station and at the UE. However, conventionally, the communication partner of an entity sending out reference signals has no knowledge about the precoder, beamformer or spatial filter used by the entity for creating the one or more transmit beams carrying or being marked with the reference signal. In other words, the communication partner, like the gNB, of the UE transmitting the reference signal does not know how the one or more transmit beams were designed, for example, to which extent it was responsive to certain transmissions from the base station towards the UE. For example, the UE may determine, based on the transmissions received from the gNB that it may be desirable to limit the number of possible transmit beams to a subset of transmit beams because some of the beams are determined to be not suited for the SRS transmission. However, the base station or gNB lacks this information and, therefore, during the beam management procedure needs to perform an iterative process including also evaluating a direction of beams from the UE that are not created at the UE thereby adding to the delay imposed by the beam management procedure on the link establishment.

The present invention addresses the above drawbacks and provides an approach at least reducing delays in the link establishment between two network entities by providing the first entity, like the gNB or a transmitting UE in the sidelink communication, with feedback indicating the one or more input parameters and/or one or more performance parameters on the basis of which the second entity, like the UE or the receiving UE in case of a sidelink communication, created one or more transmit beams that carry the reference signal. The inventive approach provides several advantages over conventional approaches not providing the inventive feedback. For example, in accordance with the present invention,

- the transmission quality may be improved due to the refinement of the beam management and alignment procedures achieved by providing the feedback of the design base used for forming the reference signal transmit beams to the base station,
- in case a beam correspondence situation does not hold which requires that another phase of the beam management procedure needs to be initiated, by means of the inventive approach the delay in the link establishment may be reduced as the beam management procedure is quicker than without feedback,
- an active interference management may be provided by enabling multiple transmission reception points, TRPs, to create beams that null or minimize an interference, using the information in the feedback, namely the design-base used at the UE,
- an improved resource management may be enabled by a coordinated transmission between TRPs based on the design base,
- in IAB networks the inter IAB-node Tx/Rx beam sweeping and selection may be improved when a beam scan is performed that provides additional information that is fed into the design base,
- the interference management between IAB nodes that operate either in half-duplex, like TDM, FDM, SDM, or that operate in full-duplex is improved; for example, in case of a half-duplex TDM, the design base may maximize the use of flexible time slots, and in case of full-duplex, the design base may improve interference management between child and parent links. Further, the design base may improve the cross-link interference management to other nodes or UEs in the network,
- respective component carriers, CCs, e.g., CCs used for carrier aggregation, CA, may use the same design base (the same set of input parameters) or different design bases (different sets of input parameters). When using the same design base (the same set of input parameters) the respective CCs may use only a part of the design base (only a subset of the input parameters). The UE may provide feedback only on one CC, like the 3 GHz carrier, but not another CC, like the 28 GHz carrier, so that only a part of the design base would be provided. In such a situation, the UE may provide the design base on another CC or carrier.

Figure 3:
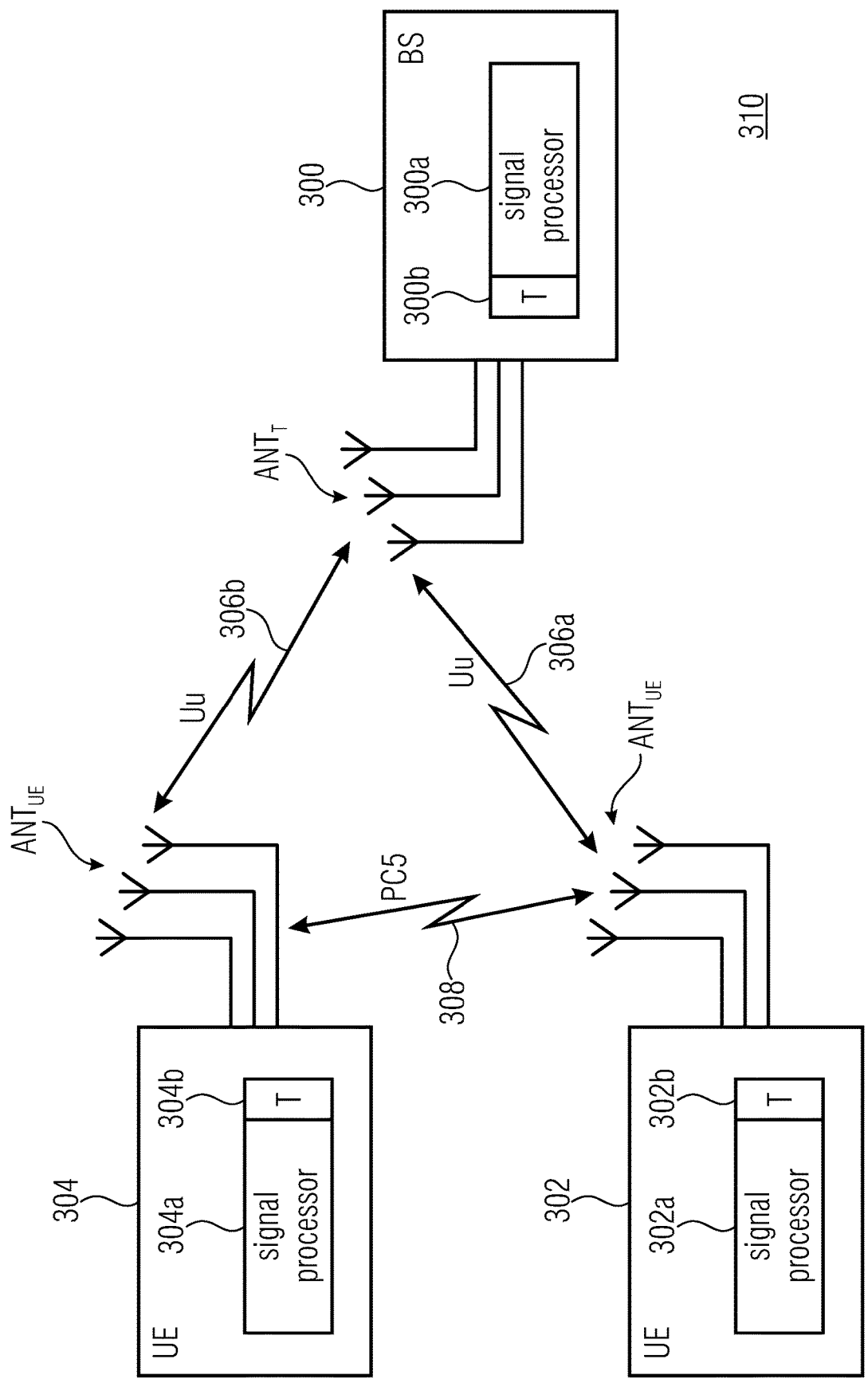
FIG. 3 is a schematic representation of a wireless communication system including a transmitter, like a base station, one or more receivers, like user devices, UEs, for implementing embodiments of the present invention.

Embodiments of the present invention may be implemented in a wireless communication system as depicted in FIG. 1 including base stations and users, like mobile terminals or IoT devices. FIG. 3 is a schematic representation of a wireless communication system including a transmitter 300, like a base station, and one or more receivers 302, 304, like user devices, UEs. The transmitter 300 and the receivers 302, 304 may communicate via one or more wireless communication links or channels 306a, 306b, 308, like a radio link. The transmitter 300 may include one or more antennas $ANT_T$ or an antenna array having a plurality of antenna elements, a signal processor 300a and a transceiver 300b, coupled with each other. The receivers 302, 304 include one or more antennas $ANT_{UE}$ or an antenna array having a plurality of antennas, a signal processor 302a, 304a, and a transceiver 302b, 304b coupled with each other. The base station 300 and the UEs 302, 304 may communicate via respective first wireless communication links 306a and 306b, like a radio link using the Uu interface, while the UEs 302, 304 may communicate with each other via a second wireless communication link 308, like a radio link using the PC5/sidelink, SL, interface. When the UEs are not served by the base station or are not connected to a base station, for example, they are not in an RRC connected state, or, more generally, when no SL resource allocation configuration or assistance is provided by a base station, the UEs may communicate with each other over the sidelink, SL. The system or network of FIG. 3, the one or more UEs 302, 304 of FIG. 3, and the base station 300 of FIG. 3 may operate in accordance with the inventive teachings described herein.

UE that Feeds Back Details of the Input Parameters Relevant to Deriving the Response Beamformer The present invention provides an apparatus for a wireless communication network, comprising:
- an antenna unit, the antenna unit including a plurality of antennas or one or more antenna arrays each having a plurality of antenna elements;
- wherein the apparatus is to communicate with one or more network entities of the wireless communication network, like a base station or another UE,
- wherein the apparatus is to transmit to the network entity a reference signal, like a Sounding Reference Signal, SRS, on one or more transmit beams beamformed by the apparatus using one or more input parameters, and
- wherein the apparatus is to transmit a feedback to the network entity, the feedback indicating the one or more input parameters the apparatus uses for beamforming the one or more transmit beams carrying the reference signal.

The present invention provides an apparatus for a wireless communication network, comprising:
- an antenna unit, the antenna unit including a plurality of antennas or one or more antenna arrays each having a plurality of antenna elements;
- wherein the apparatus is to communicate with one or more network entities of the wireless communication network, like a base station or another UE,
- wherein the apparatus is to receive from the network entity a reference signal, like a Synchronization Signal Block, SSB, on one or more receive beams beamformed by the apparatus using one or more input parameters, and
- wherein the apparatus is to transmit a feedback to the network entity, the feedback indicating the one or more input parameters the apparatus uses for beamforming the one or more receive beams carrying the reference signal.

In accordance with embodiments, instead of or in addition to sending the feedback, the apparatus is configured or preconfigured, e.g., by the network entity, with the one or more input parameters.

In accordance with embodiments, responsive to a request from the network entity, the apparatus is to send capability information indicating at least the capability of the apparatus to provide the feedback indicating the one or more input parameters the apparatus uses for beamforming the one or more transmit beams carrying the reference signal, e.g., send capability information indicating the apparatus' capability to support a transmit-spatial-feedback mode, or a receive-spatial-feedback mode.

In accordance with embodiments, the apparatus is to
receive from the one or more network entities one or more transmissions, and
beamform, responsive to the received one or more transmissions, the one or more transmit beams, and
the one or more input parameters comprise one or more parameters associated with the one or more received transmissions.

In accordance with embodiments, wherein the apparatus is to receive the one or more transmissions on one or more beams, wherein the one or more input parameters comprise one or more parameters associated with the one or more received beams.

In accordance with embodiments, the one or more parameters associated with the one or more received beams or more inputs comprising of one or more of the following:
one or more reference signals transmitted by the network entity, for example
a Channel-State Information Reference Signal, CSI-RS, like a UE-specific CSI-Type 1 feedback or a UE-specific CSI-Type 2 feedback,
a Synchronization Signal Block, SSB,
a positioning reference signal,
a phase tracking reference signal, or
a Demodulation Reference Signal, DMRS,
parameters defining the one or more received beams, for example
a codebook index of a codebook used for forming a beam at the network entity,
a resource block index indicating the time and frequency resources allocated to a beam at the network entity,
a time-slot index indicating time slots in a radio frame, allocated to a beam at the network entity, e.g. subframe, slot, OFDM symbol all describing specific time-slot allocation like a hopping pattern or a semi-persistent pattern,
a frequencies or subcarriers allocated to a beam at the network entity, e.g., in case the network entity BS uses Cyclic Delay Diversity, CDD, as transmission mode,
a band index indicating a frequency range, like n78 in FR1 or n257 in FR 2, allocated to a beam at the network entity.

In accordance with embodiments, the apparatus is to beamform the one or more transmit beams to point into one or more directions from which beams are received in accordance with one or more predefined criteria, wherein the one or more predefined criteria may comprise one or more of the following:
a signal strength of the one or more received beams exceeds a predefined threshold,
an interference level on the one or more received beams exceeds or is below a predefined threshold,
a signal strength of the one or more received beams or an interference level on the one or more received beams is exceeding the predefined threshold over a predefined time-window or is exceeding the predefined threshold a certain number of times within a predefined time-window,
a signal strength of the one or more received beams or an interference level on the one or more received beams is below the predefined threshold over a predefined time-window or is below the predefined threshold a certain number of times within a predefined time-window.

In accordance with embodiments, the apparatus is to beamform the one or more transmit beams in accordance with one or more predefined performance parameters for the one or more transmit beams, wherein the one or more predefined performance parameters may comprise one or more of the following:
a transmit power of one or more transmit beams are to fulfill regulatory Effective Isotropic Radiated Power, EIRP, limits,
a signal strength of the one or more transmit beams exceeds a predefined threshold,
a received signal-to-noise ratio at the receiver resulting from one or more transmit beams exceeds or remains below a predefined threshold,
a signal strength of one or more transmit beams is maximized,
an interference level, like inter-cell interference or a cross-link interference, on the one or more transmit beams is below a predefined threshold,
the one or more transmit beams have a predefined directivity, e.g., a single main lobe, multiple main lobes and the like.

UE that Feeds Back Details of the Objective Function Relevant to Deriving the Response Beamformer The present invention provides an apparatus for a wireless communication network, comprising:
an antenna unit, the antenna unit including a plurality of antennas or one or more antenna arrays each having a plurality of antenna elements;
wherein the apparatus is to communicate with one or more network entities of the wireless communication network, like a base station or another UE,
wherein the apparatus is to transmit to the network entity a reference signal, like a Sounding Reference Signal, SRS, on one or more transmit beams beamformed by the apparatus in accordance with one or more predefined performance parameters, and
wherein the apparatus is to transmit a feedback to the network entity, the feedback indicating the one or more predefined performance parameters in accordance with which the apparatus beamforms the one or more transmit beams.

The present invention provides an apparatus for a wireless communication network, comprising:
an antenna unit, the antenna unit including a plurality of antennas or one or more antenna arrays each having a plurality of antenna elements;
wherein the apparatus is to communicate with one or more network entities of the wireless communication network, like a base station or another UE,
wherein the apparatus is to receive from the network entity a reference signal, like a Synchronization Signal Block, SSB, on one or more receive beams beamformed by the apparatus in accordance with one or more predefined performance parameters, and wherein the apparatus is to transmit a feedback to the network entity, the feedback indicating the one or more predefined performance parameters in accordance with which the apparatus beamforms the one or more receive beams.

In accordance with embodiments, instead of or in addition to sending the feedback, the apparatus is configured or preconfigured, e.g., by the network entity, with the one or more performance parameters.

In accordance with embodiments, responsive to a request from the network entity, the apparatus is to send capability information indicating at least the capability of the apparatus to provide the feedback indicating the one or more predefined performance parameters in accordance with which the apparatus beamforms the one or more transmit beams.

In accordance with embodiments, the one or more predefined performance parameters may comprise one or more of the following:
 a transmit power of one or more transmit beams are to fulfill regulatory Effective Isotropic Radiated Power, EIRP, limits,
 a signal strength of the one or more transmit beams exceeds a predefined threshold,
 a received signal-to-noise ratio at the receiver resulting from one or more transmit beams exceeds or remains below a predefined threshold,
 a signal strength of one or more transmit beams is maximized,
 an interference level, like inter-cell interference or a cross-link interference, on the one or more transmit beams is below a predefined threshold,
 the one or more transmit beams have a predefined directivity, e.g., a single main lobe, multiple main lobes and the like.

UEs that Apply One or Both of the Feedback Options

In accordance with embodiments, the apparatus is to use the one or more transmit beams also for a further transmission to the one or more network entities, in case an antenna port used by the reference signal is in Quasi-Colocation, QCL, with an antenna port used by the further transmission.

In accordance with embodiments, the apparatus is to use the one or more receive beams also for a further reception from the one or more network entities, in case an antenna port used by the reference signal is in Quasi-Colocation, QCL, with an antenna port used by the further reception.

In accordance with embodiments, the apparatus is to indicate to the one or more network entities the antenna port used by the reference signal being in Quasi-Colocation, QCL, with the antenna port used by the further transmission In accordance with embodiments, the antenna port used by the reference signal is considered in Quasi-Colocation, QCL, with the antenna port used by the further transmission in case one or more properties, large-scale properties, of a radio channel between the apparatus and the one or more network entities are within a predefined common range common across the antenna ports, wherein the one or more properties of the radio channel include, for example, one or more of the following:
 the Doppler spread,
 the Doppler shift,
 an average delay,
 a delay spread,
 an average gain,
 a spatial Tx or Rx parameter.

In accordance with embodiments, the apparatus is to use for a further transmission to the one or more network entities the one or more transmit beams used in a previous time-slot or used at a particular time in the past before the further transmission, in case one or more properties, like large-scale properties, of a radio channel between the apparatus and the one or more network entities are within a predefined range common.

In accordance with embodiments, the apparatus is to use for a further reception from the one or more network entities one or more receive beams used in a previous time-slot or used at a particular time in the past before the further reception, in case one or more properties, like large-scale properties, of a radio channel between the apparatus and the one or more network entities are within a predefined range common.

In accordance with embodiments, the apparatus is to use the one or more beams for a further transmission or for a further reception at certain times after the previous time-slot or after the particular time in the past, e.g. within a certain time window starting at or following the previous time-slot or the particular time in the past. The certain time window may be defined by a predefined number of slots or symbols. In accordance with other embodiments, the one or more beams may be used for a further transmission or for a further reception at one or more time instances following the previous time-slot or the particular time in the past, with an interval between the previous time-slot or the particular time in the past and the one or more time instances not exceeding a certain threshold, like a predefined number of slots or symbols following the previous time-slot or the particular time in the past.

In accordance with embodiments, the apparatus is to indicate to the one or more network entities the previous time-slot or the particular time in the past.

In accordance with embodiments, the one or more properties of the radio channel include, for example, one or more of the following:
 the Doppler spread,
 the Doppler shift,
 an average delay,
 a delay spread,
 an average gain;
 a spatial Tx or Rx parameter.

In accordance with embodiments, the further transmission comprises one or more of
 a transmission of payload data, like a PUSCH,
 a transmission of control data, like a PUSCH or a PUCCH,
 a transmission of access data, like a PRACH.

In accordance with embodiments, the apparatus is to apply carrier aggregation, CA, and wherein the feedback of input parameters and/or performance parameters includes an identification of the component carriers, CCs, e.g., by dividing a set of input parameters and/or performance parameters into separate subsets associated with an index indicating the CC associated with the subset.

In accordance with embodiments, the apparatus is to
 receive transmissions form a single network entity,
 beamform the one more transmit beams such that an interference from one or more other network entities is below a predefined threshold, e.g., by directing a main lobe of a transmit beam towards the single network entity and side lobes or nulls of a transmit beam towards the one or more other network entities
 signal as the feedback to the single network entity the directions of the main lobe and the side lobes or nulls of each of the transmit beams.

In accordance with embodiments, the apparatus is to
receive transmissions form a plurality of network entities, the plurality of network entities comprising at least a first network entity and a second network entity, beamform the one more transmit beams such that transmissions are received from the first and second network entities, e.g., by directing a main lobe of one or more first transmit beams towards the first network entity and side lobes or nulls thereof towards the second network entity, and by directing a main lobe of one or more second transmit beams towards the second network entity and side lobes or nulls thereof towards the first network entity, signal as the feedback to the first and second network entities the directions of the main lobe and the side lobes or nulls of the first and second transmit beams.

In accordance with embodiments, the reference signal, like a Sounding Reference Signal, SRS, is distributed over the one or more transmit beams such that all the one or more transmit beams are marked with a one or more reference signals individually or jointly.

In accordance with embodiments, the apparatus is configured, e.g., by a core network of the wireless communication network or by a radio access network, RAN, entity, like a base station or a UE, of the wireless communication network, or is preconfigured with the control information, like an SRS Resource Indicator, SRI, indicating that the apparatus is to create beams carrying the one or more reference signals.

In accordance with embodiments,
the apparatus is configured, e.g., by a core network of the wireless communication network or by a radio access network, RAN, entity, like a base station or a UE, of the wireless communication network, or is preconfigured to provide the feedback, e.g., to use a transmit-spatial-feedback mode, via, e.g. RRC, MAC CE, DCI or like,
the UE is to receive a control signal, activating or deactivating the feedback.

In accordance with embodiments, the apparatus is to communicate with
one or more further user devices, UEs, of the wireless communication network using a sidelink, SL, interface, like a PC5 interface, and/or
one or more radio access network, RAN, entities of the wireless communication network, like one or more base stations, using a radio interface, like a Uu interface, or using a shared access band, like an unlicensed band.

In accordance with embodiments, the apparatus and/or the or more network entities of the wireless communication network comprise one or more of the following:
a user device, UE, like a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile terminal, or a stationary terminal, or a cellular IoT-UE, or a vehicular UE, or a vehicular group leader, GL, UE, or a sidelink relay, or an IoT or narrowband IoT, NB-IoT, device, or a wearable device, like a smartwatch or a fitness tracker or smart glasses, or a ground based vehicle, or an aerial vehicle, or a drone, or
a base station, like a macro cell base station or a small cell base station or a central unit of a base station or a distributed unit of a base station or a moving base station or an Integrated Access and Backhaul, IAB, base station, or a road side unit, RSU, or a building, or
any item or device provided with network connectivity enabling the item/device to communicate using the wireless communication network, e.g., a sensor or actuator, or
any item or device provided with network connectivity enabling the item/device to communicate using a sidelink in the wireless communication network, e.g., a sensor or actuator or a transceiver or any sidelink capable network entity.

Network Entity Communicating with the Inventive Apparatus

In accordance with embodiments, A network entity of a wireless communication network, wherein the network entity is to communicate with one or more inventive apparatus.

In accordance with embodiments, responsive to the feedback from the apparatus, the network entity is to
request the apparatus to send capability information indicating at least the capability of the apparatus to provide the feedback indicating the one or more input parameters the apparatus uses for beamforming the one or more transmit beams carrying the reference signal, e.g., send an inquiry about the apparatus' capability to support a transmit-spatial-feedback mode,
configure or preconfigure the apparatus to provide the feedback, e.g., to use a transmit-spatial-feedback mode, via, e.g. RRC, MAC CE, DCI or like,
adapt a transmission to the apparatus,
adjust reference signals, like CSI-RS or SSBs, e.g., by reducing or removing unused reference signals,
change beam-directions and amplitudes of one or more beams carrying the transmission,
adaptively track the one or more transmit beams from the apparatus,
directly configuring a spatial filter without using beam sweeping, In accordance with embodiments, the network entity comprise one or more of the following:
a user device, UE, like a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile terminal, or a stationary terminal, or a cellular IoT-UE, or a vehicular UE, or a vehicular group leader, GL, UE, or a sidelink relay, or an IoT or narrowband IoT, NB-IoT, device, or a wearable device, like a smartwatch or a fitness tracker or smart glasses, or a ground based vehicle, or an aerial vehicle, or a drone, or
a base station, like a macro cell base station or a small cell base station or a central unit of a base station or a distributed unit of a base station or a moving base station or an Integrated Access and Backhaul, IAB, base station, or a road side unit, RSU, or a building, or
any item or device provided with network connectivity enabling the item/device to communicate using the wireless communication network, e.g., a sensor or actuator, or any item or device provided with network connectivity enabling the item/device to communicate using a sidelink in the wireless communication network, e.g., a sensor or actuator or a transceiver or any sidelink capable network entity System/Network The present invention provides a wireless communication network, comprising a plurality of network entities communication with each other, wherein one or more of the plurality of network entities comprise an inventive apparatus or an inventive network entity.

Methods

The present invention provides a method for operating an apparatus for a wireless communication network, the apparatus including an antenna unit having a plurality of antennas or one or more antenna arrays each having a plurality of antenna elements, and the communicating with one or more network entities of the wireless communication network, like a base station or another UE, the method comprising:
transmitting to the network entity a reference signal, like a Sounding Reference Signal, SRS, on one or more transmit beams beamformed by the apparatus using one or more input parameters, and
transmitting a feedback to the network entity, the feedback indicating the one or more input parameters the apparatus uses for beamforming the one or more transmit beams carrying the reference signal.

The present invention provides a method for operating an apparatus for a wireless communication network, the apparatus including an antenna unit having a plurality of antennas or one or more antenna arrays each having a plurality of antenna elements, and the communicating with one or more network entities of the wireless communication network, like a base station or another UE, the method comprising:
receiving from the network entity a reference signal, like a Synchronization Signal Block, SSB, using one or more beams beamformed by the apparatus using one or more input parameters, and
transmitting a feedback to the network entity, the feedback indicating the one or more input parameters the apparatus uses for beamforming the one or more beams.

The present invention provides a method for operating an apparatus for a wireless communication network, the apparatus including an antenna unit having a plurality of antennas or one or more antenna arrays each having a plurality of antenna elements, and the communicating with one or more network entities of the wireless communication network, like a base station or another UE, the method comprising:
transmitting to the network entity a reference signal, like a Sounding Reference Signal, SRS, on one or more transmit beams beamformed by the apparatus in accordance with one or more predefined performance parameters, and
transmitting a feedback to the network entity, the feedback indicating the one or more predefined performance parameters in accordance with which the apparatus beamforms the one or more transmit beams.

The present invention provides a method for operating an apparatus for a wireless communication network, the apparatus including an antenna unit having a plurality of antennas or one or more antenna arrays each having a plurality of antenna elements, and the communicating with one or more network entities of the wireless communication network, like a base station or another UE, the method comprising:
receiving from the network entity a reference signal, like a Synchronization Signal Block, SSB, using one or more beams beamformed by the apparatus in accordance with one or more performance parameters, and
transmitting a feedback to the network entity, the feedback indicating the one or more performance parameters in accordance with which the apparatus beamforms the one or more beams.

In accordance with embodiments, instead of or in addition to sending the feedback, the method comprises configuring or preconfiguring the apparatus, e.g., by the network entity, with the one or more input or performance parameters.

Computer Program Product

Embodiments of the present invention provide a computer program product comprising instructions which, when the program is executed by a computer, cause the computer to carry out one or more methods in accordance with the present invention.

Figure 4:
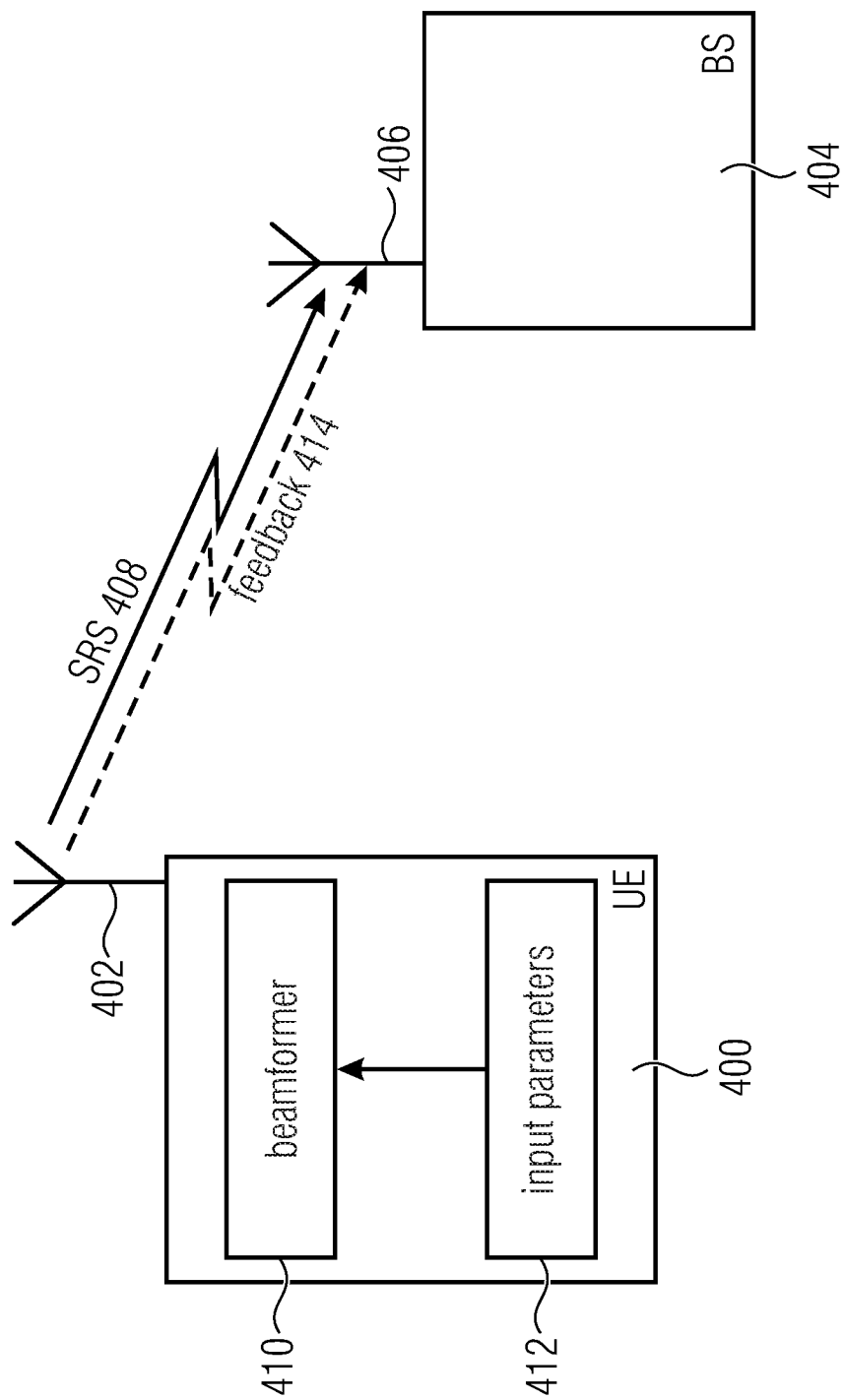
FIG. 4 is a schematic representation of a wireless communication system in accordance with an embodiment of the present invention providing feedback including input parameters for a beamformer for creating one or more beams for a reference signal transmission.

FIG. 4 illustrates an embodiment of the present invention, more specifically a user device, UE, 400 including an antenna unit 402 having a plurality of antennas or one or more antenna arrays each of which has a plurality of antenna elements. The UE 400 forms an apparatus in accordance with embodiments of the present invention. The UE 400 communicates with a base station, BS, 404 which includes an antenna unit 406 that may have a plurality of antennas or one or more antenna arrays each of which has a plurality of antenna elements. The base station 404 forms one of the network entities of the present invention with which the inventive apparatus communicates. For establishing a link between the UE 400 and the base station 404, the UE 400 transmits a reference signal, like the SRS 408. The UE 400 includes a beamformer 410 so as to create, using the antenna unit 402, one or more transmit beams. For beamforming the one or more transmit beams, the beamformer 410 operates on the basis of one or more input parameters 412. The UE 400 transmits a feedback 414 to the base station 404, and the feedback 414 indicates to the base station the one or more input parameters 412 that the UE 400 used in its beamformer 410 for beamforming the one or more transmit beams carrying the SRS 408.

In accordance with embodiments, the UE 400 receives a request from the network entity 404 to send capability information indicating at least the capability of the UE 400 to provide the feedback. For example, the UE 400 may send capability information indicating the UE's capability to support a transmit-spatial-feedback mode during which the one or more input parameters are fed back which the UE 400 uses for beamforming the one or more transmit beams carrying the reference signal.

FIG. 4 illustrates an embodiment in accordance with which the UE 400 and the base station 404 are connected over the Uu interface. More generally speaking, the UE 400 is connected to a RAN entity, like a gNB 404. However, the present invention is not limited to such embodiments, rather, the UE 400 may communicate to another UE using a sidelink communication over the PC5 interface. In such an embodiment, the network entity in FIG. 4 is formed by another UE. In the following description of the embodiments of the present invention, reference will be made primarily to the communication between the UE 400 and the base station 404, however, all embodiments are equally applicable for a sidelink communication among two or more user devices.

In accordance with embodiments, the base station 404, responsive to the feedback 414, may adapt a transmission to be sent from the base station 404 to the UE 400. In accordance with other embodiments, the base station may adjust reference signals, like the CSI-RS or a synchronization signal block, SSB, that are transmitted from the base station 404 towards the UE 400 for the link establishment. For example, the base station 404 may reduce or remove unused reference signals, i.e., reference signals not considered at the UE 400 for beamforming the transmit beams carrying the SRS 408. In accordance with yet further embodiments, the base station 400 may change the direction and amplitudes of one or more beams carrying a transmission from the base station towards the UE 400. Further, in accordance with other embodiments, the base station may adaptively track the one or more transmit beams created by the UE 400, and/or may directly configure a spatial filter without using beam sweeping on the basis of the received feedback 414.

Figure 5:
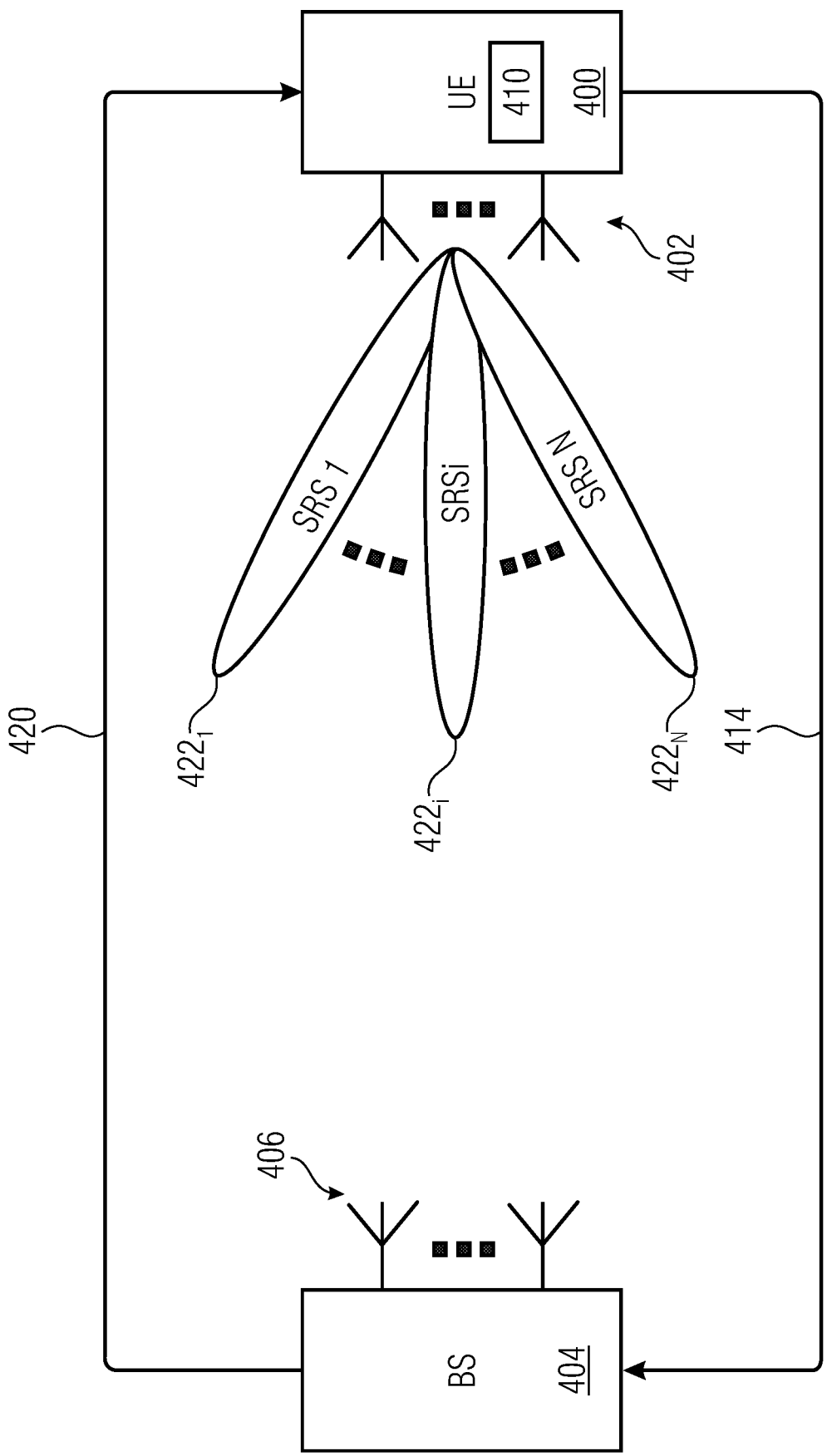
FIG. 5 is a schematic representation of a wireless communication system in accordance with another embodiment of the present invention providing feedback including input parameters for a beamformer for creating one or more beams for an SRS transmission.

FIG. 5 illustrates an embodiment of the inventive approach, more specifically the signaling and the feedback for an SRS transmission. FIG. 5 illustrates the UE 400 including the antenna unit 402 as well as the base station 404 including the antenna unit 406. FIG. 5 further illustrates the forward signal 420 from the base station 404 including reference symbols on one or more transmit beams formed by the base station 404 using its antenna unit 406. The forward signal 420 is schematically represented in FIG. 5. However, as will be apparent to the skilled person, this signal is transmitted using the transmit beams created by the antenna unit 406 of the base station 404. FIG. 5 further illustrates the feedback signal 414 that is transmitted from the UE 400 towards the base station 404. Again, the signaling of the feedback 414 is shown schematically, and it will be understood, that this signaling may be via a radio communication from the UE 400 towards the base station 404. In addition, FIG. 5 illustrates a plurality of transmit beams 422$_1$ to 422$_N$. The transmit beams 422 are beamformed by the UE 400 using its beamformer 410, and in the embodiment of FIG. 5, the transmit beams carry the SRS 408.

As explained above, the UE 400 creates the one or more transmit beams 422 using its beamformer 410 that operates on the basis of one or more input parameters, which are also referred to herein as the design base. The inventive approach, when compared to conventional approaches is advantageous as it allows more easily adapting the precoders or beamformers or spatial filters at the UE 400 and at the base station 404 for a reliable communication, especially in FR2, as by means of the feedback 414, the base station 404 is now in a position to react to the beamforming at the UE 400, for example by performing one or more of the actions described above with reference to FIG. 4.

In accordance with the present invention, UE 400 transmits the spatially filtered SRS 408 or any other kind of reference symbol or pilots or data, using the precoder $B_i^{UL}$ at the beamformer 410, wherein i is the index of the SRS sequence. Conventionally, the base station 404 has no knowledge about the precoder $B_i^{UL}$ or how it is designed, in particular, the base station 404 is not aware of the input parameters or the design base used at the beamformer 410 for obtaining the precoder that created the transmit beams 422.

Thus, the precoder may be described as follows:

$$B_i^{UL} = f(x_1, x_2, \ldots, x\_i, \ldots, x\_N)$$

In the above equation, the input parameters or the design base for the spatial precoder used in the uplink transmission from the UE 400 towards the base station 404 for carrying the SRS 408 is $(x_1, x_2, \ldots, x\_i, \ldots, x\_N)$. For example, the signal 420 transmitted by the base station 404 and received at the UE 400 may be based on one or more parameters, and upon receiving the signal 422, the UE 400 may perform the beamforming of the transmit beams 422 responsive to the transmission 420, more specifically, the UE 400 may use as input to its beamformer 410 one or more parameters associated with the one or more transmissions 420. For example, the just-mentioned parameters on the basis of which UE 400 performs the beamforming 100 and that may be associated with the signal 420 or the transmit beams used for transmitting the signal 420 may include one or more of the following:

one or more reference signals transmitted by the network entity, for example
  a Channel-State Information Reference Signal, CSI-RS, like a UE-specific CSI-Type 1 feedback or a UE-specific CSI-Type 2 feedback,
  a Synchronization Signal Block, SSB,
  a positioning reference signal,
  a phase tracking reference signal, or
  a Demodulation Reference Signal, DMRS,
parameters defining the one or more received beams, for example
  a codebook index of a codebook used for forming a beam at the network entity,
  a resource block index indicating the time and frequency resources allocated to a beam at the network entity,
  a time-slot index indicating time slots in a radio frame allocated to a beam at the network entity, e.g. in a hopping manner, e.g. subframe, slot, OFDM symbol all describing specific time-slot allocation, like a hopping pattern or a semi-persistent pattern,
  a frequencies or subcarriers allocated to a beam at the network entity, e.g., in case the network entity BS uses Cyclic Delay Diversity, CDD, as transmission mode,
  a band index indicating a frequency range, like n78 in FR1 or n247 in FR 2, allocated to a beam at the network entity.

Thus, in accordance with embodiments, the uplink beams 422 carrying the SRS may be formed on the basis of the downlink transmission 420. Some of the downlink-related parameters may be independent while others are dependent on yet further parameters and need to be signaled together with such further parameters, like the resource block index or the codebook index.

From the above-mentioned parameters, which are provided by the base station 404 via the signal 420 in accordance with embodiments of the present invention, those parameters may be reported which are used by the UE 400 for forming the response or transmit beam 422 in the uplink that is carrying the reference signal or that is marked with the reference signal, like the SRS.

The UE 400 may provide the input parameters or design base 414 on any suitable channel between the UE 400 and the base station 404, for example on the PUSCH, the PUCCH or the PRACH. In case of a sidelink communication of the UE 400 with another UE, the channel transmitting the feedback 414 may be the physical sidelink share channel, PSSCH, or the physical sidelink control channel, PSSCH.

In accordance with embodiments of the inventive approach, the UE 400 may apply carrier aggregation, CA, and the input parameters or design base may be extended to the CA case so as to include reference signal from the different components carriers, CC, and an associated reporting or feedback of the design base or input parameters may include an identification of the component carriers, CCs. For example, the feedback 414 may include a plurality of sets of input parameters used at the UE, and this set may be divided into different and separate subsets associated with an index indicating the CC associated with the subset.

In accordance with yet further embodiments, the UE 400 may also create the one or more transmit beams 422 in such a way that the transmit beams 422 point into directions from which beams are received that fulfill one or more criteria. In other words, the receive beams at the UE 400 over which the signal 420 may be received, need to fulfill a certain criterion, for example, the UE may only consider directions for the transmit beams 422 from which a beam from the base station 404 is received with a signal strength exceeding a certain threshold. Also, in accordance with other embodiments, the UE 400 may consider the forming of a transmit beam pointing into a direction from which a certain receive beam is received only in case an interference level on the receive beam exceeds or is below a predefined threshold. In accordance with other embodiments, the UE 400 may consider the forming of a transmit beam pointing into a direction from which a certain receive beam is received in case the above signal strength or interference level is exceeding the threshold over a predefined time-window or is exceeding the threshold a number of times within a predefined time-window, or the above signal strength or interference level is below the threshold over a predefined time-window or is below the threshold a number of times within the a predefined time-window.

In accordance with yet other embodiments, the UE 400 may beamform the transmit beam 422 according to a certain objective function for the transmit beam 422. For example, a transmit beam 422 may be created at the UE 400 only in case a signal strength of the transmit beam exceeds a predefined threshold. In accordance with other embodiments, the UE may decide to perform the beamforming in such a way that transmit beams 422 are created that have an interference level, like a cross-link interference level, that is below a predefined threshold. In accordance with yet other embodiments, the UE 200 may decide to create the transmit beams such that they have a predefined directivity. The just-mentioned performance parameters may be included into the feedback 414 transmitted from the UE to the base station 404, so that the base station 400, responsive to the performance parameter received via the feedback 414 may decide to implement its beamformer for forming the beams at the base station 404 in accordance with a maximum power or gain or with a maximum directivity, e.g., a single main lobe, multiple main lobes and the like, or with a minimum interference level. In accordance with further embodiments, the one or more predefined performance parameters may comprise one or more of the following:

a transmit power of one or more transmit beams are to fulfill regulatory Effective Isotropic Radiated Power, EIRP, limits, a received signal-to-noise ratio at the receiver resulting from one or more transmit beams exceeds or remains below a predefined threshold, a signal strength of one or more transmit beams is maximized.

Figure 6:
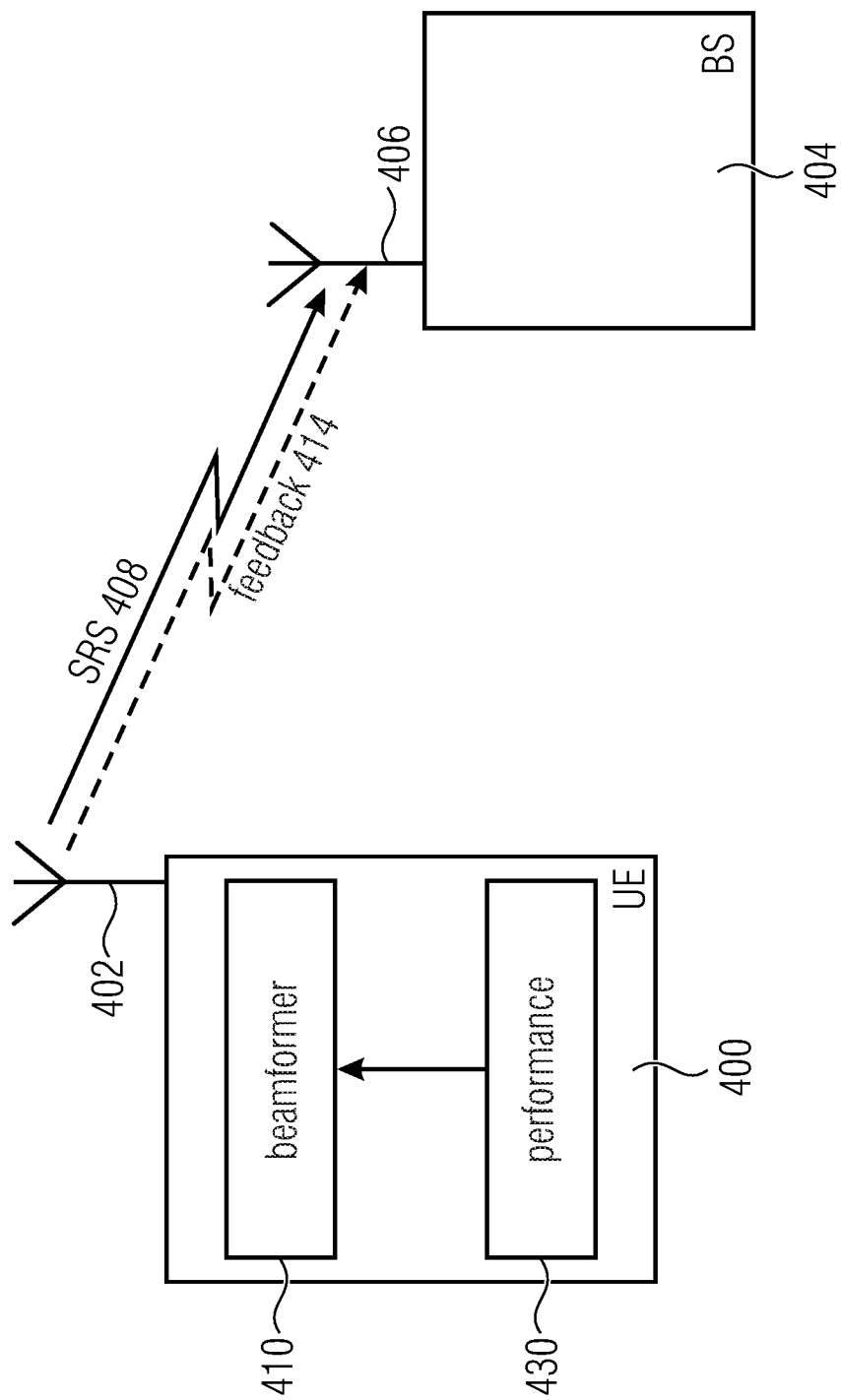
FIG. 6 is a schematic representation of a wireless communication system in accordance with yet another embodiment of the present invention providing feedback including performance parameters for a beamformer for creating one or more beams for a reference signal transmission

In accordance with yet other embodiments, the UE may transmit only the performance parameters, i.e., instead of the input parameters the performance parameters are transmitted. In other words, the feedback 414 includes only the performance parameters discussed above. FIG. 6 illustrates an embodiment of the present invention in which the feedback from the UE 400 towards the base station 404 includes the above-described performance parameters. FIG. 6, basically, corresponds to FIG. 4, except that the beamformer 410 receives the performance parameters 430 on the basis of which the UE 400 creates the one or more transmit beams so that the one or more performance parameters 430 are fulfilled, like a certain signal strength, a certain interference level or a certain directivity. Based on the desired performance, the UE, using the UE's antenna 402, creates the one or more transmit beams being marked with or carrying the SRS 408. The feedback 414 indicates to the base station 404 the one or more performance parameters used at the UE 400 for creating the one or more transmit beams carrying the SRS 408.

In accordance with embodiments, the UE 400 receives a request from the network entity 404 to send capability information indicating at least the capability of the UE 400 to provide the feedback. For example, the UE 400 may send capability information indicating the UE's capability to support a feedback mode during which the one or more performance parameters are fed back which the UE 400 uses for beamforming the one or more transmit beams carrying the reference signal.

In accordance with further embodiments of the present invention, the UE 400 may apply the same input parameters or design base for different uplink channels, i.e., a currently used design base may be a previous instance of an existing design base, which is reapplied to create the SRS for the uplink channels. In other words, the UE 400 may use the transmit beams created in accordance with the above-described embodiments also for a further transmission to the base station. In accordance with embodiments, the UE 400 may use or reapply an existing design base, like the above-mentioned input parameters and/or performance parameters, for a further transmission in case an antenna port used by the reference signal, like the SRS, is in quasi-co location, QCL, with an antenna port used by the further transmission. Thus, similar to a QCL assumption in the downlink, the UE 400 may provide the design base, like the input parameters 412 and/or the performance parameters 430, of an earlier or a prior transmission on a particular channel, like the above-mentioned PUSCH, PUCCH, PRACH, PSSCH or PSCCH. The UE 400 may apply the same design base for different uplink channels, and a QCL may be assumed when the antenna port used by the reference signal and an antenna port used by the further transmission show certain properties, like large-scale properties, that are within a predefined common range. Such properties may include one or more of a Doppler spread, a Doppler shift, an average delay, a delay spread or an average gain.

The design base may be reused for creating one or more transmit beams that originate from antenna elements of the UE's antenna unit 402 that are different from those antenna elements the UE's antenna 402 used for beamforming on the basis of the previous instance of the design base. For example, different antenna panels or antenna arrays or, more generally, different transmission reception points, TRPs, defined by the antenna unit 402 may be used at the UE when reapplying the previous instance of the design base. The design base may also depend on the selected transmit port or the selected transmit panels that are used by the UE 400.

Figure 7:
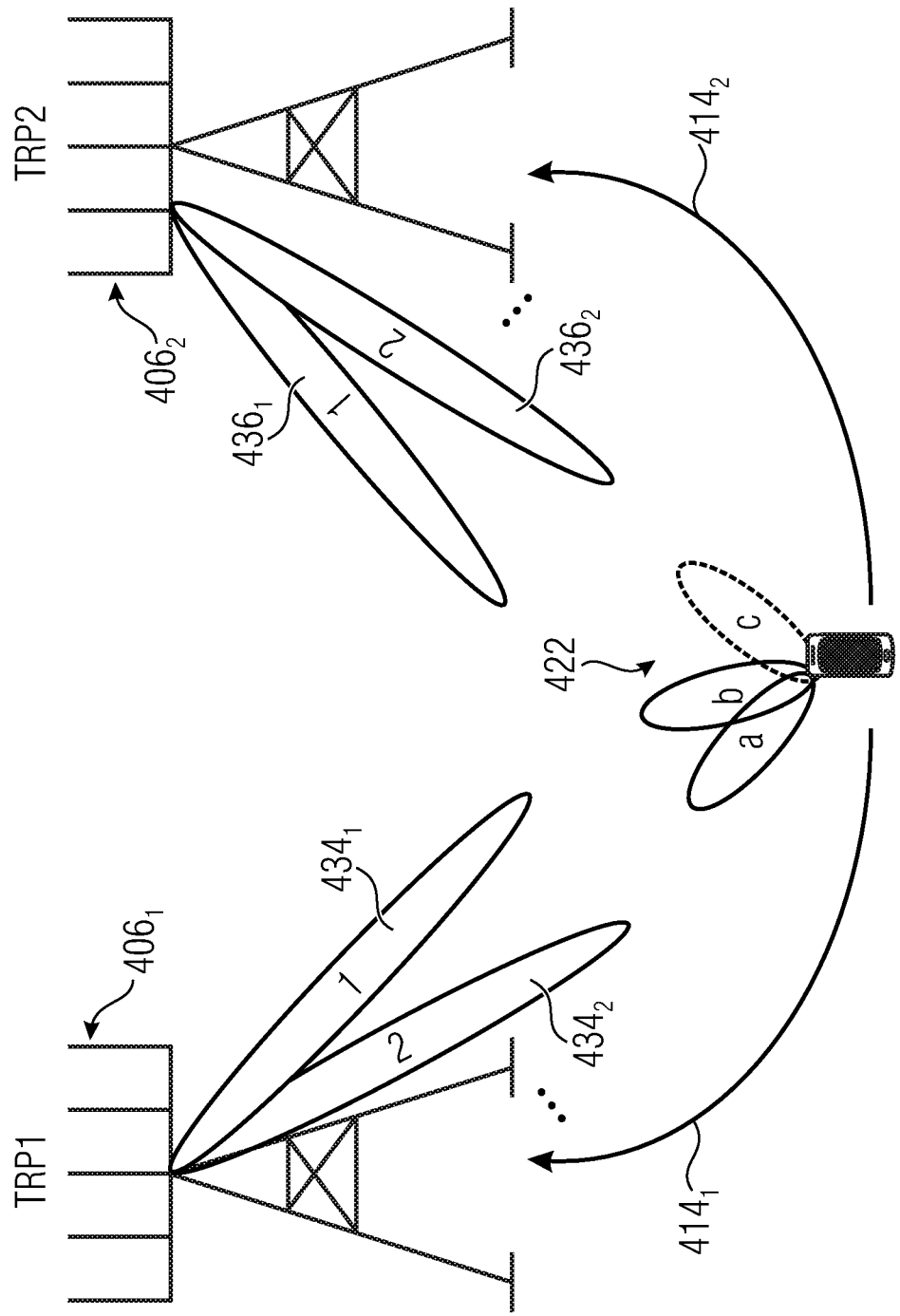
FIG. 7 is a schematic representation of a wireless communication system including a user device and two base stations and operating in accordance with a further embodiment of the present invention.

In accordance with yet further embodiments of the present invention, the design base used for creating the transmit beams at the UE 400 for transmitting the SRS 408, i.e., the input parameters 412 and/or the performance parameters 430, may consider transmissions from other network entities, like other base stations or other UEs in the vicinity of the UE 400. FIG. 7 illustrates an embodiment illustrating, schematically, UE 400 and two base stations or transmission reception points TRP1 and TRP2 including respective antenna units $406_1$ and $406_2$ allowing to form one or more transmit beams. In the example depicted in FIG. 7, TRP1 creates transmit beams 434, like the depicted transmit beams $434_1$ and $434_2$, while TRP2 creates the transmit beams 436, like the depicted transmit beams $436_1$ and $436_2$. The transmit beams 434 and 436 are directed towards the position of the UE 400. In accordance with embodiments, the design base, like the input/performance parameters input into the beamformer 410, may be selected such that transmissions from other network entities are suppressed or are used. In accordance with embodiments, there may be a need to consider the same grid of beams, but with a different source point, like different TRPs as depicted in FIG. 7, and the design base may refer to the same tilt or different tilts, elevation, and/or to the same or different azimuth directions. This may also be used to manage interference between base stations by providing the information about side lobes or null, for example, by using a larger or smaller subset of antenna limits with a given antenna array.

When considering FIG. 7 and a situation in which the UE 400 is served only by a single TRP, like TRP1, UE 400 may create the transmit beam 422 for transmitting the SRS towards the serving base station TRP1 such that only transmit beams a and b are formed that are directed into the direction from which transmit beams $434_1$ and $434_2$ are received, while transmit beam c may be created such that only a side lobe or even a null is directed towards the direction from which transmit beams $436_1$ and $436_2$ of the interfering TRP 2 are received, thereby avoiding, minimizing or coordinating interference between the base station.

In accordance with yet other embodiments, UE 400 shown in FIG. 7 may be served both by TRP1 and by TRP2, i.e., there may be a joint reception, like a coordinated multipoint, CoMP, transmission. In such scenarios, UE 400 may beamform the beam 422 carrying the SRS in such a way that the beams a and b are created so that the main lobes are directed into the direction from which the transmit beams $434_1$ and $434_2$ from TRP1 are received, and, other than in the case in which the TRP2 is an interfering TRP, the transmit beam c is formed in such a way that its main lobe is directed into a direction from which the beams $436_1$ and $436_2$ are received. In such a scenario, other than in the first scenario in which the feedback is only provided to TRP1, as schematically indicated at $414_1$, the feedback is provided both to TRP1 and TRP2, as indicated at $414_1$ and at $414_2$. By providing the feedback $414_1$, $414_2$ to the one or more serving base stations TRP1 and TRP2, the inventive approach allows for an improved transmission configuration and resource selection for the downlink and uplink transmissions between UE 400 and the TRP1 and the TRP2.

Figure 8:
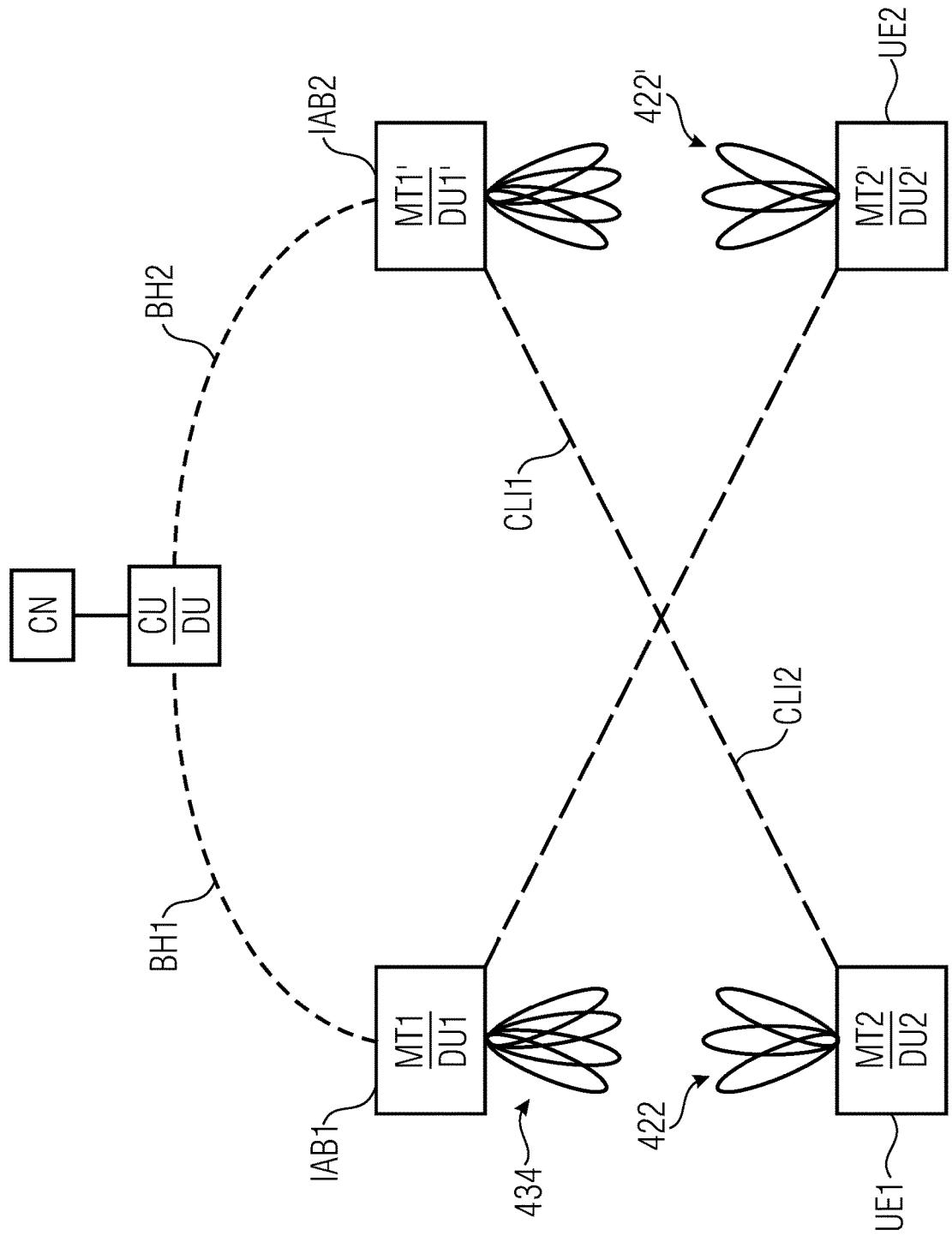
FIG. 8 illustrates a timeslot allocation in an IAB network in accordance with an embodiment of the present invention that may also depend on the half-duplex or full-duplex capabilities of the IAB nodes.

In accordance with embodiments, the inventive approach may be advantageously employed in an IAB network requiring, as explained above, a tight control of the beams establishing the communication between the UE and the network entity, namely the IAB node. FIG. 8 illustrates the timeslot allocation in an IAB network that may also depend on the half-duplex or full-duplex capabilities of the IAB nodes. FIG. 8 illustrates two branches of an IAB network where cross-link interference may be an issue. FIG. 8 illustrates a first IAB node $IAB_1$ and a second IAB node $IAB_2$ which may be stationary or mobile nodes. In FIG. 8, it is assumed that the nodes IAB1 and IAB2 are mobile nodes that are connected via a wireless connection (see the dotted lines) with a collocated DU/CU, like a gNB, which, in turn, is connected to the core network, CN, via a wired connection (see the full line). FIG. 8 further illustrates two UEs, namely UE1 and UE2. For example, UE1 may request the other entities, namely IAB1, IAB2 and UE2 that are located within its vicinity to perform a large coverage beam scan, as is schematically indicated by the respective transmit beams schematically illustrated at 434, 436 and 422'. On the basis of the beam scan performed by the respective entities, UE1 may determine potential directions from which interference is to be expected, for example, for a communication between UE1 and IAB1. Such directions may also be referred to as victim directions and may be included into the design base, i.e., may be an input parameter for the beamformer at UE1, when creating the uplink beams 422 carrying the reference signal towards IAB1.

In accordance with embodiments, the scan may be realized by using beam sweeping, for example as used for the SSB, and responsive to a request from UE1, or in regular intervals, or by a coordination among all entities in the network. Thus, in accordance with embodiments, the uplink and downlink beam selections are based on the design base that also includes beams from the other branches of the network in FIG. 8 that may suffer interference or that may cause interference, like a crosslink interference, CLI, schematically indicated in FIG. 8, like the potential crosslink interference CLI1 from IAB1 to UE2 or CLI2 from IAB2 to UE1. The present embodiment provides for a mechanism allowing to initiate the beam scan that feeds the additional information about potentially interfering beams into the design base, thereby extending the design base and enabling an increase in the number of flexible time slots.

In accordance with further embodiments of the present invention, the UE 400 may apply the same input parameters or design base for different uplink channels, i.e., a currently used design base may be a previous instance of an existing design base, which is reapplied to create the SRS for the uplink channels. In other words, the UE 400 may use the transmit beams created in accordance with the above-described embodiments also for a further transmission to the base station. In accordance with embodiments, the UE 400 may use or reapply an existing design base, like the above-mentioned input parameters and/or performance parameters, for a further transmission in case an antenna port used by the reference signal, like the SRS, is in quasi-co location, QCL, with an antenna port used by the further transmission. Thus, similar to a QCL assumption in the downlink, the UE 400 may provide the design base, like the input parameters 412 and/or the performance parameters 430, of an earlier or a prior transmission on a particular channel, like the above-mentioned PUSCH, PUCCH, PRACH, PSSCH or PSCCH. The UE 400 may apply the same design base for different uplink channels, and a QCL may be assumed when the antenna port used by the reference signal and an antenna port used by the further transmission show certain properties, like large-scale properties, that are within a predefined common range. Such properties may include one or more of a Doppler spread, a Doppler shift, an average delay, a delay spread or an average gain.

The design base may be reused for creating one or more transmit beams that originate from antenna elements of the UE's antenna unit 402 that are different from those antenna elements the UE's antenna 402 used for beamforming on the basis of the previous instance of the design base. For example, different antenna panels or antenna arrays or, more generally, different transmission reception points, TRPs, defined by the antenna unit 402 may be used at the UE when reapplying the previous instance of the design base. The design base may also depend on the selected transmit port or the selected transmit panels that are used by the UE 400.

In accordance with further embodiments, the design base used for creating one or more transmit beams in the past may be used in the same channel for a current transmission. In other words, the UE 400 may use earlier transmit beams created for the reference signal also for other uplink transmissions in the same channel provided the channel did not chance to much. For example, the UE 400 may use for a current transmission to the base station 404 the one or more transmit beams used in a previous time-slot or used at a particular time in the past before the current transmission, in case one or more properties, like large-scale properties, of the radio channel between the UE 400 and the BS 404 are within a predefined range common. The UE 400 may signal or indicate to the BS 404 information about the previous time-slot or the particular time in the past so that the BS 404 may obtain information about the design base used at that time without the need for an additional feedback. The current transmission comprises, for example, a transmission of payload data, like a PUSCH, or a transmission of control data, like a PUSCH or a PUCCH, or a transmission of access data, like a PRACH.

The one or more properties of the radio channel include, for example, one or more of the following:
the Doppler spread,
the Doppler shift,
an average delay,
a delay spread,
an average gain.

The UE 400, in accordance with embodiments, may be configured or preconfigured with the control information, like an SRS Resource Indicator, SRI, indicating that the apparatus is to create beams carrying the one or more reference signals, e.g., by a core network of the wireless communication network or by a radio access network, RAN, entity, like the base station 404 or a UE of the wireless communication network.

In accordance with further embodiments, the UE 400 may be configured or preconfigured to provide the feedback, e.g., by a core network of the wireless communication network or by a radio access network, RAN, entity, like a base station or a UE, of the wireless communication network. For example, the UE 400 may use a transmit-spatial-feedback mode, and may be configured/preconfigured via RRC, MAC CE, DCI or like. When being configured/preconfigured to provide the feedback, the UE 400 may receive a control signal, activating or deactivating the feedback.

In accordance with yet further embodiments of the present invention, the design base used for creating the transmit beams at the UE 400 for transmitting the SRS 408, i.e., the input parameters 412 and/or the performance parameters 430, may consider transmissions from other network entities, like other base stations or other UEs in the vicinity of the UE 400. FIG. 7 illustrates an embodiment illustrating, schematically, UE 400 and two base stations or transmission reception points TRP1 and TRP2 including respective antenna units 406$_1$ and 406$_2$ allowing to form one or more transmit beams. In the example depicted in FIG. 7, TRP1 creates transmit beams 434, like the depicted transmit beams 434$_1$ and 434$_2$, while TRP2 creates the transmit beams 436, like the depicted transmit beams 436$_1$ and 436$_2$. The transmit beams 434 and 436 are directed towards the position of the UE 400. In accordance with embodiments, the design base, like the input/performance parameters input into the beamformer 410, may be selected such that transmissions from other network entities are suppressed or are used. In accordance with embodiments, there may be a need to consider the same grid of beams, but with a different source point, like different TRPs as depicted in FIG. 7, and the design base may refer to the same tilt or different tilts, elevation, and/or to the same or different azimuth directions. This may also be used to manage interference between base stations by providing the information about side lobes or null, for example, by using a larger or smaller subset of antenna limits with a given antenna array.

When considering FIG. 7 and a situation in which the UE 400 is served only by a single TRP, like TRP1, UE 400 may create the transmit beam 422 for transmitting the SRS towards the serving base station TRP1 such that only transmit beams a and b are formed that are directed into the direction from which transmit beams 434$_1$ and 434$_2$ are received, while transmit beam c may be created such that only a side lobe or even a null is directed towards the direction from which transmit beams 436$_1$ and 436$_2$ of the interfering TRP 2 are received, thereby avoiding, minimizing or coordinating interference between the base station.

In accordance with yet other embodiments, UE 400 shown in FIG. 7 may be served both by TRP1 and by TRP2, i.e., there may be a joint reception, like a coordinated multipoint, CoMP, transmission. In such scenarios, UE 400 may beamform the beam 422 carrying the SRS in such a way that the beams a and b are created so that the main lobes are directed into the direction from which the transmit beams 434$_1$ and 434$_2$ from TRP1 are received, and, other than in the case in which the TRP2 is an interfering TRP, the transmit beam c is formed in such a way that its main lobe is directed into a direction from which the beams 436$_1$ and 436$_2$ are received. In such a scenario, other than in the first scenario in which the feedback is only provided to TRP1, as schematically indicated at 414$_1$, the feedback is provided both to TRP1 and TRP2, as indicated at 414$_1$ and at 414$_2$. By providing the feedback 414$_1$, 414$_2$ to the one or more serving base stations TRP1 and TRP2, the inventive approach allows for an improved transmission configuration and resource selection for the downlink and uplink transmissions between UE 400 and the TRP1 and the TRP2.

In accordance with embodiments, the inventive approach may be advantageously employed in an IAB network requiring, as explained above, a tight control of the beams establishing the communication between the UE and the network entity, namely the IAB node. FIG. 8 illustrates the timeslot allocation in an IAB network that may also depend on the half-duplex or full-duplex capabilities of the IAB nodes. FIG. 8 illustrates two branches of an IAB network where cross-link interference may be an issue. FIG. 8 illustrates a first IAB node IAB$_1$ and a second IAB node IAB$_2$ which may be stationary or mobile nodes. In FIG. 8, it is assumed that the nodes IAB1 and IAB2 are mobile nodes that are connected to the core network, CN, via respective backhaul communication links BH1 and BH2. FIG. 8 further illustrates two UEs, namely UE1 and UE2. For example, UE1 may request the other entities, namely IAB1, IAB2 and UE2 that are located within its vicinity to perform a large coverage beam scan, as is schematically indicated by the respective transmit beams schematically illustrated at 434, 436 and 422'. On the basis of the beam scan performed by the respective entities, UE1 may determine potential directions from which interference is to be expected, for example, for a communication between UE1 and IAB1. Such directions may also be referred to as victim directions and may be included into the design base, i.e., may be an input parameter for the beamformer at UE1, when creating the uplink beams 422 carrying the reference signal towards IAB1.

In accordance with embodiments, the scan may be realized by using beam sweeping, for example as used for the SSB, and responsive to a request from UE1, or in regular intervals, or by a coordination among all entities in the network. Thus, in accordance with embodiments, the uplink and downlink beam selections are based on the design base that also includes beams from the other branches of the network in FIG. 8 that may suffer interference or that may cause interference, like a crosslink interference, CLI, schematically indicated in FIG. 8, like the potential crosslink interference CLI1 from IAB1 to UE2 or CLI2 from IAB2 to UE1. The present embodiment provides for a mechanism allowing to initiate the beam scan that feeds the additional information about potentially interfering beams into the design base, thereby extending the design base and enabling an increase in the number of flexible time slots.

Figure 9:
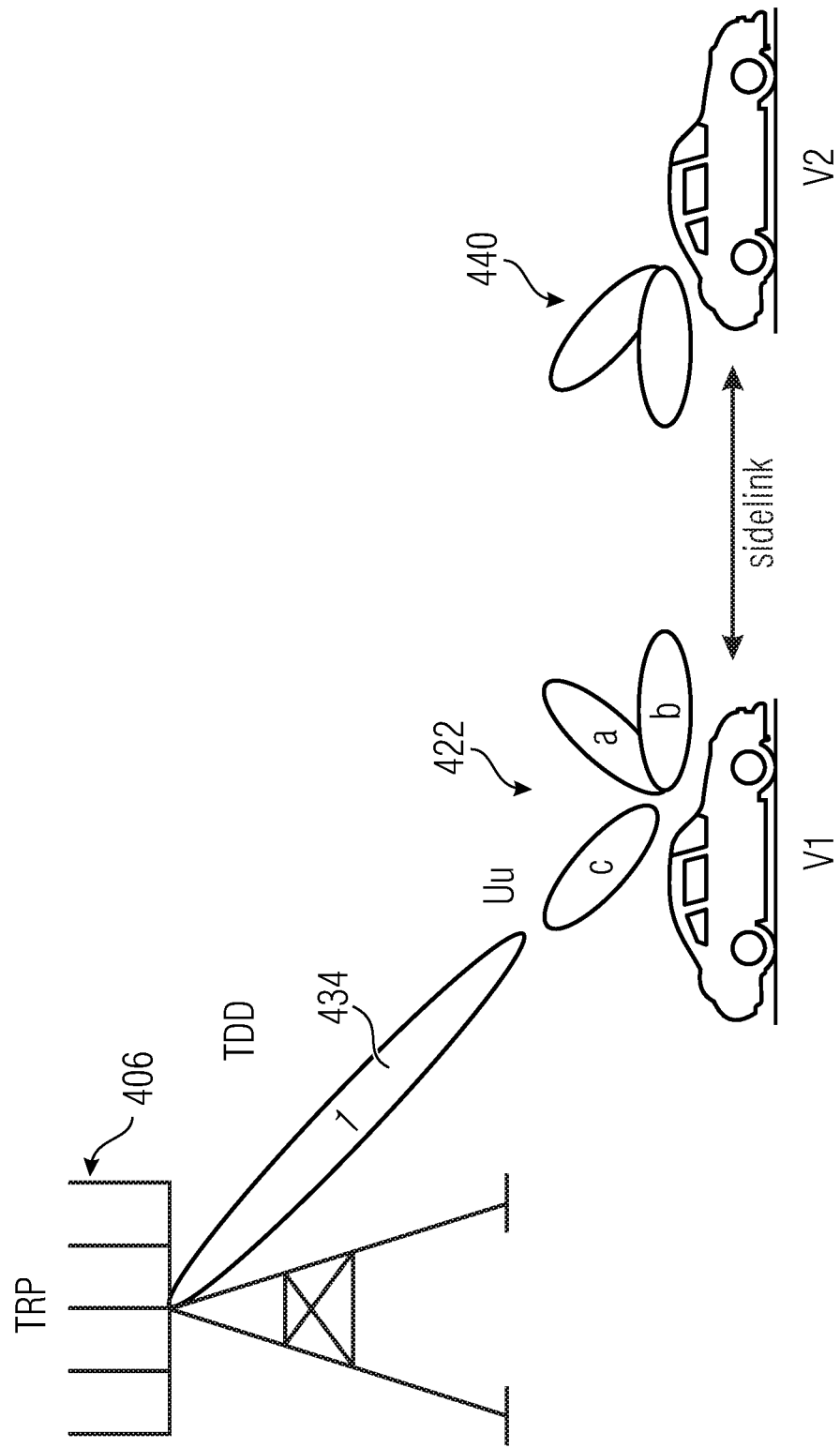
FIG. 9 illustrates an embodiment of the present invention implemented for a V2X communication of a mobile user device.

In the embodiments described so far, reference has been made to a communication between a UE and a RAN entity, like a base station, however, as mentioned earlier, the inventive approach is not limited to such scenarios. Rather; also a D2D communication or a UE-UE link may make use of the inventive concept, like a V2X communication. In case of a UE-UE link, the inventive approach of informing a transmitting UE about the design base on the basis of which the reference signal beams are formed may be more important than in the embodiments described so far as a faster convergence for a symmetric beam set selection may be desirable in such use cases. FIG. 9 illustrates an embodiment for a V2X communication of a first mobile user device, like vehicle V1. The communication from V1 may either be a communication to a base station TRP including the antenna unit 406 via the Uu interface and/or it may be a communication over the sidelink interface with another UE, like vehicle V2. Vehicles V1 and V2 may include a UE as describes in the above embodiments. The vehicle V1 may use a design base for its beamformer so as to create the so-called sidelink beams a and b for the sidelink communication towards the vehicle V2, while the beam c is used for the communication over the Uu interface towards the TRP. In accordance with embodiments, for the sidelink mode without cellular coverage, like a mode 2 NR transmission or a mode 4 LTE transmission, an iterative mode may be enabled. For example, after transmitting spatially filtered reference signals or pilots, vehicle V1 also sends its design base to vehicle V2. Vehicle V2 then sends pilots to vehicle V1 together with its design base. In the next step, vehicle V1 may change the design base for vehicle V2 so that in such a mode, the design base scheme may be used for an iterative beam alignment.

In accordance with other embodiments, when being in coverage, like in a mode 1 NR transmission or in a mode 3 LTE transmission, the signaling between the TRP and the vehicle V1 may be done explicitly, for example, by transmitting the design base from vehicle V1 to the TRP. The signaling may also be implicitly, for example, by pointing to a codebook or other resource indices. The signaling may use the MIB, the SIB, the RRC, the DCI, the PDSCH, the PUSCH, the PUCCH or the PDCCH.

As mentioned above, in accordance with the inventive concept, the UE, like vehicle V1 or vehicle V2, may send additional feedback information on how the uplink spatial filter $B_i^{UL}$ is designed, i.e., the design base, like the input parameter 412 or performance parameter 430, that result in the uplink spatial filter used by the vehicle V1 may be signaled, for example by indices pointing towards measured downlink reference signals, like CSI-RS or SSB or other parameters as mentioned above. The base station or other UE, on the basis of the received feedback, has knowledge about the design base that was used for creating the one or more transmit beams carrying the SRS signal and, for example, a base station may perform an adjustment of the CSI-RS or the SSBs. For example, the CSI-RS or SSBs that were not taken into consideration at the UE may be reduced or removed, which leads to an improvement of the overall spectral efficiency. For example, by means of the feedback, the base station may be provided with an implicit knowledge of advantageous CSI-RS or SSB directions or indices.

A refinement at the base station may be combined with a one-bit feedback causing a change in the beam directions or amplitudes and causing the base station to wait if the SNR or SINR becomes better or worse.

Also, an adaptive tracking of an uplink beam set may be performed at the base station or also on both sides of the communication. The feedback may allow a direction configuration of the spatial filter on both ends of the communication without using beam sweeping techniques, thereby reducing the latency for the link establishment.

The base station may improve or track the CSI-RS or SSB base for the beam correspondence approach, which is the ability of the UE to select a suitable beam for the uplink transmission base on the downlink measurement with or without relying on uplink beam sweeping. For example, the beam correspondence requirement may be satisfied when assuming the presence of both SSB and CSI-RS signals and a type D QCL being maintained between the SSB and the CSI-RS. When considering a multi-stream beam correspondence, like when using a rank being larger than 1, a mutual design base exchange may allow for an easier tracking or precoding or decoding of the combined channel.

In the following, a beam management procedure in accordance with an embodiment of the present invention is described.

Initially, in step (a), the UE 400, like the UE described in the above embodiments, estimates precoded downlink signals that may form the input into the design base used for beamforming the SRS transmit beams.

In step (b), based on the received precoded downlink signals, the UE 400 derives suitable precoders or spatial filters for the uplink transmission.

In step (c), the UE may signal to the base station 404 its capability to inform the base station 404 about its design base.

In step (d), the network may define the operation modes for the design base feedback and signals this information to the UE, to multiple UEs or to a group of UEs via the MIB, the SIB, via an RRC signaling or using the DCI. The operation modes may include a non-periodic mode in accordance with which the design base feedback is performed only on demand, for example, in case it is requested by the base station for certain reference signals, like a certain SRS. The operation mode may also include a periodic mode for a certain SRS, as requested by the base station, or it may include a periodic mode to be used for all SRS.

In step (e), the UE 409 signals the design base for the precoder or beamformer via the feedback 440 to the base station 404. For example, the design base may be exchanged via the feedback signaling 414 differentially or as a complete set, dependent on a capability as signaled by the UE.

In step (f), the base station 404 may instruct the UE 400 or a group of UEs to adapt or refine the design base or specify the design base in accordance with a certain configuration, or by excluding some entries from the design base.

In step (g), the UE 400 may calculate new SRS spatial filters on the basis of the constraints received from the base station in step (f) and/or by using a new design base. In other words, the inventive approach, in accordance with embodiments, may use a similar signaling as used for a known downlink QCL. In this context, the UE 400 may be instructed to use the same design base (QCL-Type D=Spatial Rx Parameters which equals transmit beams from a gNB taken as input parameters). For example, the UE 400 may use the same TX spatial parameters, which were chosen as a response to a received SSB. The UE 400 may use the same Tx spatial parameters when responding to CSI-RS. Furthermore, the UE 400 may report in a similar fashion which design base it has chosen. A similar signaling (code) is used on the downlink. A description for different QCL types and how they are applied for DL reference signals may be found in reference [11].

In the embodiments described so far, reference has been made mainly to the feedback of the design base, like the input parameters, and/or the performance parameters for the transmit beams. In accordance with these embodiments, the UE may, similarly to TCI on the DL, use an UL TCI (uTCI) to signal to the gNB its PUSCH, PUCCH or SRS reference. However, the present invention is not limited to such embodiments. The above embodiments are equally applicable to a feedback of the design base, like the input parameters, and/or the performance parameters for receive beams used by, e.g., the UE, for receiving a transmission from a network entity, like a base station.

For example, when considering FIG. 4 again, in accordance with further embodiments, for establishing a link between the UE 400 and the base station 404, the BS 404 transmits a reference signal, like a synchronization signal block, SSB. The UE 400 includes a beamformer 410 so as to create, using the antenna unit 402, one or more receive beams. For beamforming the one or more receive beams, the beamformer 410 operates on the basis of one or more input parameters 412. The UE 400 transmits the feedback 414 to the base station 404, and the feedback 414 indicates to the base station the one or more input parameters 412 that the UE 400 used in its beamformer 410 for beamforming the one or more receive beams for receiving the SSB. In accordance with embodiments, the base station 404, responsive to the feedback 414, may adapt a transmission to be sent from the base station 404 to the UE 400. In accordance with other embodiments, the base station may adjust the reference signals, like the CSI-RS or the synchronization signal block, SSB, that are transmitted from the base station 404 towards the UE 400 for the link establishment. For example, the base station 404 may reduce or remove unused reference signals, i.e., reference signals not considered at the UE 400 for beamforming the receive beams. In accordance with yet further embodiments, the base station 400 may change the direction and amplitudes of one or more beams carrying a transmission from the base station towards the UE 400.

In accordance with yet other embodiments, when considering FIG. 6 again, the beamformer 410 receives a performance parameters 430 on the basis of which the UE 400 creates the one or more receive beams so that the one or more performance parameters 430 are fulfilled, like a certain signal strength, a certain interference level or a certain directivity. Based on the desired performance, the UE, using the UE's antenna 402, creates the one or more receive beams, and the feedback 414 indicates to the base station 404 the one or more performance parameters used at the UE 400 for creating the one or more receive beams.

Thus, in accordance with embodiments, when creating transmit and/or receive beams, the apparatus may signal to the gNB a corresponding design base. The design base combines different input parameters or performance parameters used for transmit and/or receive beamforming. The design base may also indicate a relationship or a linkage between different signals, e.g. SRS and DMRS on PUCCH and PUSCH, or SSB, CSI-RS etc. The concept of a design base provides flexibility in a number and combination of parameters and relations that can be indicated to the network by the UE. Hence, as a part of transmit-spatial-feedback mode capability signaling, the UE may also indicate to the network which design base it is supporting. The same applies for receive-spatial-feedback mode.

In the embodiments described so far, reference has been made mainly to the feedback of the design base, like the input parameters, and/or the performance parameters for the transmit beams. In accordance with these embodiments, the UE may, similarly to TCI on the DL, use an UL TCI (uTCI) to signal to the gNB its PUSCH, PUCCH or SRS reference. However, the present invention is not limited to such embodiments. The above embodiments are equally applicable to a feedback of the design base, like the input parameters, and/or the performance parameters for receive beams used by, e.g., the UE, for receiving a transmission from a network entity, like a base station.

The embodiments described so far referred to a feedback of the design base, so as to indicate by an apparatus (a UE or a base station) to a transmitter (like a UE or a base station) the input or performance parameters applied for creating the transmit/receive beams. However, the present invention is not limited to such embodiments, rather, in accordance with other embodiments, the apparatus may not send a feedback but apply, for creating the transmit/receive beam, one or more configured or preconfigured design bases (sets of input parameters) or configured or preconfigured performance parameters. In other words, while the previous embodiments referred to an apparatus providing feedback on the design base applied for a receive or transmit beamformer (also referred to as a post-action feedback), the apparatus may can also be preconfigured/configured to use a particular design base at a current or future time-slot or a frame.

For example, the apparatus may be configured with the one or more design bases at certain events, like one or more of the following:
  when initially connecting to the network,
  responsive to determining, e.g., by the network, that certain parameters, like interference or cross-link-interference, changed,
  during beam or cell handover,
  at a beam failure,
  while adding additional component carriers.

In accordance with embodiments, e.g., in case the apparatus is configured/preconfigured with more than one design base or performance parameter, the above described embodiments may be applied in combination some that the design base or performance parameter(s) actually used by the apparatus for the beamforming process are included in a feedback to a transmitter.

In accordance with embodiments, the inventive approach may be applied for addressing a crosslink interference, CLI, (e.g., a CLI as schematically indicated in FIG. 8 or other CLI scenarios). For example, CLI may be experienced between base stations, e.g., a first base station is subject to CLI from a second base station. In accordance with embodiments, the base station operate as follows:
  The first base station is selecting its received beamformer based on (a design base) SRS from UEs and SSB/CSI-RS from the second base station, which create interference.

The second base station is selecting its transmit beamformer based on (a design base) CSI feedback from its UEs and CLI information from the first base station.

The base stations may exchange information suitable to select an appropriate design base, including a CLI feedback.

The above example may also be applied between UEs suffering from CLI. Here, the CLI information may be exchanged directly between the UEs (e.g. via the sidelink) or via the base stations.

General

Although the respective aspects and embodiments of the inventive approach have been described separately, it is noted that each of the aspects/embodiments may be implemented independent from the other, or some or all of the aspects/embodiments may be combined. Moreover, the subsequently described embodiments may be used for each of the aspects/embodiments described so far.

Although some of the embodiments above are described with reference to a sidelink pool, it is noted that the present invention is not limited to such embodiments. Rather, the inventive approach may be implemented in a system or network providing a set or resources to be used for a certain communication between entities in the network, and the set of resources may be preconfigured so that the entities of the network are aware of the set of resources provided by the network, or the entities may be configured by the network with the set of resources. The set of resources provided by the network may be defined as one or more of the following:

a sidelink resource pool, to be used by the UE for sidelink communications, e.g. direct UE-to-UE communication via PC5, a configured grant including or consisting of resources to be used by the UE for NR-U communications, a configured grant including or consisting of resources to be used a reduced capability UE.

In accordance with embodiments, the wireless communication system may include a terrestrial network, or a non-terrestrial network, or networks or segments of networks using as a receiver an airborne vehicle or a space-borne vehicle, or a combination thereof.

In accordance with embodiments of the present invention, the UE and/or the further UE comprise one or more of the following: a power-limited UE, or a hand-held UE, like a UE used by a pedestrian, and referred to as a Vulnerable Road User, VRU, or a Pedestrian UE, P-UE, or an on-body or hand-held UE used by public safety personnel and first responders, and referred to as Public safety UE, PS-UE, or an IoT UE, e.g., a sensor, an actuator or a UE provided in a campus network to carry out repetitive tasks and requiring input from a gateway node at periodic intervals, a mobile terminal, or a stationary terminal, or a cellular IoT-UE, or a vehicular UE, or a vehicular group leader (GL) UE, or a sidelink relay, or an IoT or narrowband IoT, NB-IoT, device, or wearable device, like a smartwatch, or a fitness tracker, or smart glasses, or a ground based vehicle, or an aerial vehicle, or a drone, or a base station e.g. gNB, or a moving base station, or road side unit (RSU), or a building, or any other item or device provided with network connectivity enabling the item/device to communicate using the wireless communication network, e.g., a sensor or actuator, or any other item or device provided with network connectivity enabling the item/device to communicate using a sidelink the wireless communication network, e.g., a sensor or actuator, or a transceiver, or any sidelink capable network entity.

In accordance with embodiments of the present invention, a network entity comprises one or more of the following: a macro cell base station, or a small cell base station, or a central unit of a base station, or a distributed unit of a base station, or a road side unit (RSU), or a UE, or a group leader (GL), or a relay or a remote radio head, or an AMF, or an SMF, or a core network entity, or mobile edge computing (MEC) entity, or a network slice as in the NR or 5G core context, or any transmission/reception point, TRP, enabling an item or a device to communicate using the wireless communication network, the item or device being provided with network connectivity to communicate using the wireless communication network.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 10 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Ahmadi, Sassan. 5G NR: Architecture, Technology, Implementation, and Operation of 3 gpp New Radio Standards, 2019. Print.

[2] X. Lin, J. Li, R. Baldemair, T. Cheng, S. Parkvall, D. Larsson, H. Koorapaty, M. Frenne, S. Falahati, A. Grövlen and others, "5G new radio: Unveiling the essentials of the next generation wireless access technology", arXiv preprint arXiv:1806.06898, 2018

[3] Erik Dahlman, Stefan Parkvall, and Johan Skold. 2018. 5G NR: The Next Generation Wireless Access Technology (1st. ed.). Academic Press, Inc., USA, FIG. 11.13

[4] 3GPP, 5G; NR; Physical layer procedures for data, TS 38.214 version 16.2.0, Release 16, Section 6.2.1.2

[5] Huawei, HiSilicon, Tdoc R1-1800090—Summary of remaining details of SRS design, RAN1 #92, 2018

[6] 3GPP, 5G; Study on New Radio (NR) access technology, TR 38.912 version 14.0.0 Release 14, Section 8.3.1.6.3.1

[7] https://www.sharetechnote.com/html/5G/5G_DCI.html

[8] 3GPP, 5G; NR; Physical layer procedures for data, TS 38.214, version V16.0.0, Release 16

[9] 3GPP, 5G; NR; Study on Integrated Access and Backhaul; Release 16, Section 7.3

[10] 3GPP, WID Enhancements to Integrated Access and Backhaul for NR, RP-193251, December 2019

[11] https://www.sharetechnote.com/html/5G/5G_QCL.html

The invention claimed is:

1. An apparatus for a wireless communication network, comprising:
an antenna unit, the antenna unit comprising a plurality of antennas or one or more antenna arrays each comprising a plurality of antenna elements;
wherein the apparatus is to communicate with one or more network entities of the wireless communication network, like a base station or another UE,
wherein the apparatus is to transmit to or receive from the network entity a reference signal, like a Sounding Reference Signal, SRS, or a Synchronization Signal Block, SSB, using one or more beams beamformed by the apparatus using one or more input parameters, and
wherein the apparatus is configured or preconfigured, e.g., by the network entity, with the one or more input parameters, and
wherein, responsive to a request from the network entity, the apparatus is to send capability information indicating at least the capability of the apparatus to provide a feedback indicating the one or more input parameters the apparatus uses for beamforming the one or more beams, e.g., send capability information indicating the apparatus' capability to support a transmit-spatial-feedback mode or a receive-spatial-feedback mode.

2. The apparatus of claim 1, wherein the apparatus is to:
receive from the one or more network entities one or more transmissions, and
beamform, responsive to the received one or more transmissions, the one or more transmit beams, and
wherein the one or more input parameters comprise one or more parameters associated with the one or more received transmissions.

3. The apparatus of claim 2, wherein the one or more parameters associated with the one or more received beams comprise:
one or more reference signals transmitted by the network entity, for example
a Channel-State Information Reference Signal, CSI-RS, like a UE-specific CSI-Type 1 feedback or a UE-specific CSI-Type 2 feedback, a Synchronization Signal Block, SSB,
a positioning reference signal,
a phase tracking reference signal, or
a Demodulation Reference Signal, DMRS, or
parameters defining the one or more received beams, for example
  a codebook index of a codebook used for forming a beam at the network entity,
  a resource block index indicating time and frequency resources allocated to
  a beam at the network entity,
  a time-slot index indicating time slots in a radio frame, allocated to a beam at the network entity, e.g. sub-frame, slot, OFDM symbol all describing specific time-slot allocation like a hopping pattern or a semi-persistent pattern,
  a frequencies or subcarriers allocated to a beam at the network entity, e.g., in case the network entity BS uses Cyclic Delay Diversity, CDD, as transmission mode, or
  a band index indicating a frequency range, like n78 in FR1 or n257 in FR 2, allocated to a beam at the network entity.

4. The apparatus of claim 2, wherein the apparatus is to beamform the one or more beams to point into one or more directions from which beams are received in accordance with one or more predefined criteria, wherein the one or more predefined criteria may comprise:
  a signal strength of the one or more received beams exceeds a predefined threshold,
  an interference level on the one or more received beams exceeds or is below a predefined threshold,
  a signal strength of the one or more received beams or an interference level on the one or more received beams is exceeding the predefined threshold over a predefined time-window or is exceeding the predefined threshold a certain number of times within a predefined time-window, or
  a signal strength of the one or more received beams or an interference level on the one or more received beams is below the predefined threshold over a predefined time-window or is below the predefined threshold a certain number of times within a predefined time-window.

5. The apparatus of claim 1, wherein the apparatus is to receive one or more transmissions on one or more beams, wherein the one or more input parameters comprise one or more parameters associated with the one or more received beams.

6. The apparatus of claim 1, wherein the apparatus is to beamform the one or more beams in accordance with one or more predefined performance parameters for the one or more beams, wherein the one or more predefined performance parameters may comprise:
  a transmit power of one or more transmit beams are to fulfill regulatory Effective Isotropic Radiated Power, EIRP, limits,
  a signal strength of the one or more transmit beams exceeds a predefined threshold,
  a received signal-to-noise ratio at the receiver resulting from one or more transmit beams exceeds or remains below a predefined threshold,
  a signal strength of one or more transmit beams is maximized,
  an interference level, like a cross-link interference, on the one or more transmit beams is below a predefined threshold, or
  the one or more transmit beams comprise a predefined directivity, e.g., a single main lobe, multiple main lobes and the like.

7. The apparatus of claim 1, wherein the apparatus is to use the one or more beams also for a further transmission to or a further reception from the one or more network entities, in case an antenna port used by the reference signal is in Quasi-Colocation, QCL, with an antenna port used by the further transmission or by the further reception, and wherein the apparatus is to indicate to the one or more network entities the antenna port used by the reference signal being in Quasi-Colocation, QCL, with the antenna port used by the further transmission or by the further reception, or the antenna port used by the reference signal is considered in Quasi-Colocation, QCL, with the antenna port used by the further transmission or by the further reception in case one or more properties, like large-scale properties, of a radio channel between the apparatus and the one or more network entities are within a predefined common range common across the antenna ports, wherein the one or more properties of the radio channel comprise:
  the Doppler spread,
  the Doppler shift,
  an average delay,
  a delay spread,
  an average gain, or
  a spatial Tx or Rx parameter, or
the further transmission/reception comprises:
  a transmission/reception of payload data, like a PUSCH/PDSCH,
  a transmission/reception of control data, like a PUSCH/PDSCH or a PUCCH/PDCCH, or
  a transmission/reception of access data, like a PRACH/PRACH response.

8. The apparatus of claim 1, wherein the apparatus is to use for a further transmission to or for a further reception from the one or more network entities the one or more beams used in a previous time-slot or used at a particular time in the past before the further transmission or before the further reception, in case one or more properties, like large-scale properties, of a radio channel between the apparatus and the one or more network entities are within a predefined range common.

9. The apparatus of claim 8, wherein the apparatus is to use the one or more beams at certain times after at the previous time-slot or used at the particular time in the past, e.g. within a certain time window starting at or following the previous time-slot or used at the particular time in the past, or at one or more time instances following the previous time-slot or the particular time in the past, with an interval between the previous time-slot or the particular time in the past and the one or more time instances not exceeding a certain threshold, or the apparatus is to indicate to the one or more network entities the previous time-slot or the particular time in the past, or wherein the one or more properties of the radio channel comprise:
  the Doppler spread,
  the Doppler shift,
  an average delay,
  a delay spread,
  an average gain, or
  a spatial Tx or Rx parameter.

10. The apparatus of claim 1, wherein the apparatus is to apply carrier aggregation, CA, and wherein the feedback of input parameters and/or performance parameters comprises an identification of the component carriers, CCs, e.g., by dividing a set of input parameters and/or performance parameters into separate subsets associated with an index indicating the CC associated with the subset.

11. The apparatus of claim 1, wherein the apparatus is to:
    transmit to or receive from a single network entity,
    beamform the one more beams such that an interference from one or more other network entities is below a predefined threshold, e.g., by directing a main lobe of a beam towards the single network entity and side lobes or nulls of a beam towards the one or more other network entities, and
    signal as the feedback to the single network entity the directions of the main lobe and the side lobes or nulls of each of the beams.

12. The apparatus of claim 1, wherein the apparatus is to:
    transmit to or receive form a plurality of network entities, the plurality of network entities comprising at least a first network entity and a second network entity,
    beamform the one more beams such that transmissions are received from the first and second network entities, e.g., by directing a main lobe of one or more first beams towards the first network entity and side lobes or nulls thereof towards the second network entity, and by directing a main lobe of one or more second beams towards the second network entity and side lobes or nulls thereof towards the first network entity, and
    signal as the feedback to the first and second network entities the directions of the main lobe and the side lobes or nulls of the first and second beams.

13. The apparatus of claim 1, wherein the reference signal, like a Sounding Reference Signal, SRS, is distributed over the one or more beams such that all the one or more beams are marked with a one or more reference signals individually or jointly.

14. The apparatus of claim 1, wherein the apparatus is configured, e.g., by a core network of the wireless communication network or by a radio access network, RAN, entity, like a base station or a UE, of the wireless communication network, or is preconfigured with the control information, like an SRS Resource Indicator, SRI, indicating that the apparatus is to create beams carrying the one or more reference signals, or the apparatus is configured, e.g., by a core network of the wireless communication network or by a radio access network, RAN, entity, like a base station or a UE, of the wireless communication network, or is preconfigured to provide the feedback, e.g., to use a transmit-spatial-feedback mode, via, e.g. RRC, MAC CE, DCI or like, and the UE is to receive a control signal activating or deactivating the feedback.

15. The apparatus of claim 1, wherein the apparatus is to communicate with one or more further user devices, UEs, of the wireless communication network using a sidelink, SL, interface, like a PC5 interface, and/or one or more radio access network, RAN, entities of the wireless communication network, like one or more base stations, using a radio interface, like a Uu interface, or using a shared access band, like an unlicensed band.

16. A network entity of a wireless communication network, wherein the network entity is to communicate with one or more apparatus for a wireless communication network, the apparatus comprising:
    an antenna unit, the antenna unit comprising a plurality of antennas or one or more antenna arrays each comprising a plurality of antenna elements;
    wherein the apparatus is to communicate with one or more network entities of the wireless communication network, like a base station or another UE,
    wherein the apparatus is to transmit to or receive from the network entity a reference signal, like a Sounding Reference Signal, SRS, or a Synchronization Signal Block, SSB, using one or more beams beamformed by the apparatus using one or more input parameters,
    wherein the apparatus is configured or preconfigured, e.g., by the network entity, with the one or more input parameters, and
    wherein, responsive to a request from the network entity, the apparatus is to send capability information indicating at least the capability of the apparatus to provide a feedback indicating the one or more input parameters the apparatus uses for beamforming the one or more beams, e.g., send capability information indicating the apparatus' capability to support a transmit-spatial-feedback mode or a receive-spatial-feedback mode.

17. The network entity of claim 16, wherein, responsive to the feedback from the apparatus, the network entity is to perform:
    request the apparatus to send capability information indicating at least the capability of the apparatus to provide the feedback indicating the one or more input parameters the apparatus uses for beamforming, e.g., send an inquiry about the apparatus' capability to support a transmit-spatial-feedback mode or a receive-spatial-feedback mode,
    configure or preconfigure the apparatus to provide the feedback, e.g., to use a transmit-spatial-feedback mode or a receive-spatial-feedback mode, via, e.g. RRC, MAC CE, DCI or like,
    adapt a transmission to or a reception from the apparatus,
    adjust reference signals, like CSI-RS or SSBs, e.g., by reducing or removing unused reference signals,
    change beam-directions and amplitudes of one or more beams,
    adaptively track the one or more beams from the apparatus, or
    directly configuring a spatial filter without using beam sweeping.

18. A wireless communication network, comprising a plurality of network entities communication with each other, wherein one or more of the plurality of network entities comprises:
    an apparatus for a wireless communication network, or a network entity to communicate with the apparatus,
    wherein the apparatus comprises:
        an antenna unit, the antenna unit comprising a plurality of antennas or one or more antenna arrays each comprising a plurality of antenna elements;
        wherein the apparatus is to communicate with one or more network entities of the wireless communication network, like a base station or another UE,
        wherein the apparatus is to transmit to or receive from the network entity a reference signal, like a Sounding Reference Signal, SRS, or a Synchronization Signal Block, SSB, using one or more beams beamformed by the apparatus using one or more input parameters,
        wherein the apparatus is configured or preconfigured, e.g., by the network entity, with the one or more input parameters, and
        wherein, responsive to a request from the network entity, the apparatus is to send capability information indicating at least the capability of the apparatus to provide a feedback indicating the one or more input parameters the apparatus uses for beamforming the one or more beams, e.g., send capability information indicating the apparatus' capability to support a transmit-spatial-feedback mode or a receive-spatial-feedback mode.

19. A method for operating an apparatus for a wireless communication network, the apparatus comprising an antenna unit comprising a plurality of antennas or one or more antenna arrays each comprising a plurality of antenna elements, and the communicating with one or more network entities of the wireless communication network, like a base station or another UE, the method comprising:
    transmitting to or receiving from the network entity a reference signal, like a Sounding Reference Signal, SRS, or a Synchronization Signal Block, SSB, using one or more beams beamformed by the apparatus using one or more input parameters, and
    configuring or preconfiguring the apparatus, e.g., by the network entity, with the one or more input parameters,
    wherein, responsive to a request from the network entity, sending, by the apparatus, capability information indicating at least the capability of the apparatus to provide a feedback indicating the one or more input parameters the apparatus uses for beamforming the one or more beams, e.g., send capability information indicating the apparatus' capability to support a transmit-spatial-feedback mode or a receive-spatial-feedback mode.

* * * * *